(12) United States Patent
Barrera et al.

(10) Patent No.: US 7,897,248 B2
(45) Date of Patent: Mar. 1, 2011

(54) ORIENTED NANOFIBERS EMBEDDED IN A POLYMER MATRIX

(75) Inventors: Enrique V. Barrera, Houston, TX (US); Fernando J. Rodriguez-Macias, Houston, TX (US); Karen Lozano, McAllen, TX (US); Luis Paulo Felipe Chibante, Houston, TX (US); David Harris Stewart, Houston, TX (US)

(73) Assignee: William Marsh Rice University, Houston, TX (US)

( * ) Notice: Subject to any disclaimer, the term of this patent is extended or adjusted under 35 U.S.C. 154(b) by 0 days.

(21) Appl. No.: 12/025,626

(22) Filed: Feb. 4, 2008

(65) Prior Publication Data
US 2009/0104386 A1    Apr. 23, 2009

Related U.S. Application Data

(63) Continuation of application No. 10/149,216, filed as application No. PCT/US00/33291 on Dec. 7, 2000, now abandoned.

(60) Provisional application No. 60/169,273, filed on Dec. 7, 1999.

(51) Int. Cl.
*B32B 5/02* (2006.01)
*C08K 3/04* (2006.01)

(52) U.S. Cl. .................. 428/295.4; 524/495; 524/496

(58) Field of Classification Search .............. 524/445, 524/495, 496; 428/295.4
See application file for complete search history.

(56) References Cited

U.S. PATENT DOCUMENTS

| | | | | |
|---|---|---|---|---|
| 6,203,814 B1 * | 3/2001 | Fisher et al. | ................. | 424/443 |
| 6,265,466 B1 * | 7/2001 | Glatkowski et al. | .......... | 523/137 |
| 6,299,812 B1 * | 10/2001 | Newman et al. | .......... | 264/176.1 |
| 6,426,134 B1 * | 7/2002 | Lavin et al. | ................ | 428/300.1 |
| 6,749,712 B2 * | 6/2004 | Kuper | .......................... | 156/296 |

* cited by examiner

*Primary Examiner* — Vickey Nerangis
(74) *Attorney, Agent, or Firm* — Winstead PC

(57) ABSTRACT

A method of forming a composite of embedded nanofibers in a polymer matrix is disclosed. The method includes incorporating nanofibers in a plastic matrix forming agglomerates, and uniformly distributing the nanofibers by exposing the agglomerates to hydrodynamic stresses. The hydrodynamic said stresses force the agglomerates to break apart. In combination or additionally elongational flow is used to achieve small diameters and alignment. A nanofiber reinforced polymer composite system is disclosed. The system includes a plurality of nanofibers that are embedded in polymer matrices in micron size fibers. A method for producing nanotube continuous fibers is disclosed. Nanofibers are fibrils with diameters of 100 nm, multiwall nanotubes, single wall nanotubes and their various functionalized and derivatized forms. The method includes mixing a nanofiber in a polymer; and inducing an orientation of the nanofibers that enables the nanofibers to be used to enhance mechanical, thermal and electrical properties. Orientation is induced by high shear mixing and elongational flow, singly or in combination. The polymer may be removed from said nanofibers, leaving micron size fibers of aligned nanofibers.

19 Claims, 32 Drawing Sheets

UNIDIRECTIONAL
IN DRAWN WIRE AND EXTRUDED
RODS AXIAL ORIENTATION DESIRED

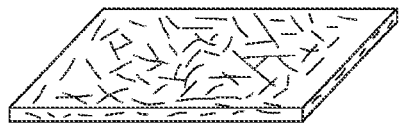
BIDIRECTIONAL
IN LAMINATED SHEETS OR CYLINDERS
PLANER ORIENTATION DESIRED

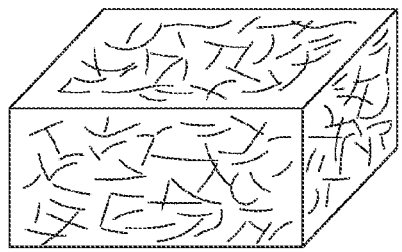
TRIDIRECTIONAL
IN THICK MOLDING AND CASTING
COMPLETE RANDOM ORIENTATION DESIRED

*Fig. 27*

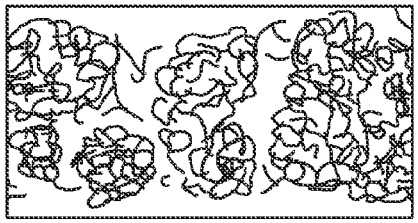
BALLING
CAUSED BY FIBER LENGTH TOO LONG MOD TOO LOW, ALLOWING FIBERS TO BALL UP IN NON-INTERCONNECTING GROUPS OF REINFORCEMENTS

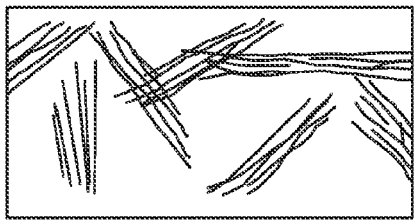
PARALLELING
CAUSED BY POOR PROCESSING TECHNIQUE OR RAW MATERIAL FORMS SUCH AS CHOPPED FIBER GAZE

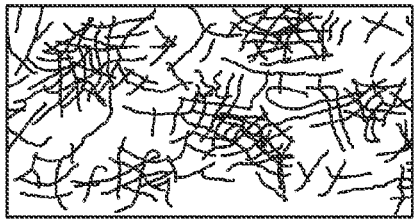
GROUPING
CAUSED BY INEFFICIENT MIXING, SETTLING OUT IN LIQUID MATRIX

*Fig. 28*

SCHEMATIC SHOWING A 90°/180° ORIENTATION OF FDM TRACES IN A TENSILE SAMPLE. THE + INDICATES THE TRACE IS IN THE DIRECTION OF THE TENSILE AXIS AND THE ARROWS INDICATE THE TRACE IS ALIGNED PERPENDICULAR TO THE APPLIED LOAD.

TABLE: PARAMETERS USED TO CALCULATE THE PROPERTIES OF SWNT COMPOSITES BY RULE OF MIXTURE CALCULATIONS BASED ON AN ABS POLYMER AS THE MATRIX.

| PARAMETERS | VALUE | SOURCE |
|---|---|---|
| SWNT DIAMETER | 1.4 nm | A.G. RINZLER, J. LIU, H. DAI, P. NIKOLAEV, C.B. HUFFMAN, F.J. RODRIGUEZ-MACIAS, P.J. BOUL, A.H. LU, D. HEYMANN, D.T. COLBERT, R.S. LEE, J.E. FISCHER, A.M. RAO, P.C. ECKLUND, AND R.E. SMALLEY, APPL. PHYS. A67, 29 (1998) |
| SWNT LENGTH | 300 nm | PER BARRERA/SMALLEY CONVERSATION |
| SWNT ROPE DIAMETER | 10 nm | J.P. SALVETAT, G.A.D. BRIGGS, J.M. BONARD, R.R. BASCA, A.J. KULIK, T. STOCKLI, N.A. BURNHAM, AND L. FORRO. PHYS. REV. LETT. 82, 944 (1999) |
| SWNT ROPE LENGTH SWNT | 6 Um | J.P. SALVETAT, G.A.D. BRIGGS, J.M. BONARD, R.R. BASCA, A.J. KULIK, T. STOCKLI, N.A. BURNHAM, AND L. FORRO. PHYS. REV. LETT. 82, 944 (1999) |
| TENSILE STRENGTH | 50 GPa | H.D. WAGNER, O. LOURIE, Y. FELDMAN AND R. TENNE, APPL. PHYS. LETT. 72, 188 (1998) |
| SWNT ROPE TENSILE STRENGTH | 13 GPa | M.F. YU, B.S. FILES, S. AREPALLI AND R.S. RUOFF, PHYS. REV. LETT. 84, 5552 (2000) |
| SWNT/ABS INTERFACIAL STRENGTH | 500 MPa | H.D. WAGNER, O. LOURIE, Y. FELDMAN AND R. TENNE, APPL. PHYS. LETT. 72, 188 (1998) |
| SWNT ROPE SHEAR STRENGTH | 6 MPa | P.M. AJAYAN, L.S. SCHADLER, C. GIANNARIS, AND A. RUBIO, ADV. MAT. 12, 750 (2000) |
| SWNT DENSITY | 1.39 g/cm | CALCULATED |
| ABS DENSITY | 1.04 g/cm | SIGMA-ALDRICH CHEMICAL COMPANY |
| ABS TENSILE STRENGTH | 22.8 mpa | EXPERIMENTALLY MEASURED |

*Fig. 46*

TABLE 1 PROPERTIES OF VGCF AND ABS
VGCF PROPERTIES       POLYGRAPH III

MAGNUM ABS                              GMID #31875
TENSILE STRENGTH (PSI): 5,000           ELONGATION (%): 50
FLEXURAL STRENGTH (PSI): 9,500          HARDNESS (SHORE D): R105
TENSILE MODULUS (PSI): 360,000          SOFTENING POINT (R&B) (F): 220

FLEXURAL MODULUS (PSI): 360,000         SPECIFIC GRAVITY (GMS/cm³): 1.05
NOTCHED IMPACT (FT lB/IN): 2.00

TABLE 2. TENSILE DATA FOR SWNT/ABS FDM COMPOSITES.
SAMPLE No.  PEAK LOAD (lb) CROSS SECTIONAL AREA (IN ) *STRESS (PSI) STRAIN TO BREAK
            MODULUS (KPSI)
(%)
1    40.2   0.0178  2260   1.7   118
2    49.2   0.0171  2876   1.7   179
3    45     0.0178  2540   1.7   160
4    57.2   0.0192  2978   1.7   204
5    50     0.0187  2719   1.7   136

*STRESS VALUE ARE BASED ON MEASURED STARTING AREAS AND NOT ON ACTUAL TEST
DUE TO INCOMPLETE FUSION.

*Fig. 47*

ORIENTED NANOFIBERS EMBEDDED IN A POLYMER MATRIX

CROSS-REFERENCE TO RELATED APPLICATIONS

This application is a continuation of U.S. patent application Ser. No. 10/149,216 filed Nov. 15, 2002, now abandoned which is a 35 U.S.C. 371 national application of International Application Number PCT/US00/33291 filed on Dec. 7, 2000, which designated the United States, claiming priority to provisional application 60/169,273 filed on Dec. 7, 1999, and further, such applications are hereby incorporated by reference.

STATEMENT OF SPONSORED RESEARCH

This invention was made with Government support under NSF Grant No. DMR-9357505 awarded by the National Science Foundation and NASA Grants No. NCC9-77 and STTR Grant NAS 9 99129, awarded by the National Aeronautics and Space Administration. The Government may have certain rights in the invention.

BACKGROUND OF THE INVENTION

Field of the Invention

The present invention relates to the development of a nanofiber reinforced polymer composite system with control over the orientation of the nanofibers dispersed in the system.

Most synthetic and cellulosic manufactured fibers are created by "extrusion"—forcing a thick, viscous liquid through a spinneret to form continuous filaments of semi-solid polymer. In their initial state, the fiber-forming polymers are solids and therefore must be first converted into a fluid state for extrusion. This is usually achieved by melting, if the polymers are thermoplastic synthetics (i.e., they soften and melt when heated), or by dissolving them in a suitable solvent if they are non-thermoplastic cellulosics. If they cannot be dissolved or melted directly, they must be chemically treated to form soluble or thermoplastic derivatives. Recent technologies have been developed for some specialty fibers made of polymers that do not melt, dissolve, or form appropriate derivatives. For these materials, the small fluid molecules are mixed and reacted to form the otherwise intractable polymers during the extrusion process.

The spinnerets used in the production of most manufactured fibers have from one to several hundred holes. As the filaments emerge from the holes in the spinneret, the liquid polymer is converted first to a rubbery state and then solidified. This process of extrusion and solidification of endless filaments is called spinning, not to be confused with the textile operation of the same name, where short pieces of staple fiber are twisted into yarn. There are four methods of spinning filaments of manufactured fibers: wet, dry, melt, and gel spinning.

Wet spinning is the oldest process. It is used for fiber-forming substances that have been dissolved in a solvent. The spinnerets are submerged in a chemical bath and as the filaments emerge they precipitate from solution and solidify. Because the solution is extruded directly into the precipitating liquid, this process for making fibers is called wet spinning. Acrylic, rayon, aramid, modacrylic and spandex are produced by this process.

Dry spinning is also used for fiber-forming substances in solution. However, instead of precipitating the polymer by dilution or chemical reaction, solidification is achieved by evaporating the solvent in a stream of air or inert gas. The filaments do not come in contact with a precipitating liquid, eliminating the need for drying and easing solvent recovery. This process is used for the production of acetate, triacetate, acrylic, modacrylic, PBI, spandex, and vinyon.

In melt spinning, the fiber-forming substance is melted for extrusion through the spinneret and then directly solidified by cooling. Nylon, olefin, polyester, saran and sulfur are produced in this manner. Melt spun fibers can be extruded from the spinneret in different cross-sectional shapes (round, trilobal, pentagonal, octagonal, and others).

Gel spinning is a special process used to obtain high strength or other special fiber properties. The polymer is not in a true liquid state during extrusion. Not completely separated, as they would be in a true solution, the polymer chains are bound together at various points in liquid crystal form. This produces strong inter-chain forces in the resulting filaments that can significantly increase the tensile strength of the fibers. In addition, the liquid crystals are aligned along the fiber axis by the shear forces during extrusion. The filaments emerge with an unusually high degree of orientation relative to each other, further enhancing strength. The process can also be described as dry-wet spinning, since the filaments first pass through air and then are cooled further in a liquid bath. Some high-strength polyethylene and aramid fibers are produced by gel spinning.

While extruded fibers are solidifying, or after they have hardened, the filaments may be drawn or elongated to impart strength. Drawing pulls the molecular chains together and orients them along the fiber axis, creating a considerably stronger yarn.

SUMMARY OF THE INVENTION

A method of embedding nanofibers in a polymer matrix so that high degrees of alignment may be achieved is accomplished by a nanofiber continuous fiber ("NCF") system. These micron-size fibers provide for easy handling of nanofibers, provide for control of their distribution, including high degrees of alignment, for subsequent manipulation, and for ease of processing and manufacturing into a range of parts for mechanical, electrical and thermal applications. NCFs are continuous fibers with dispersed nanofibers which can be produced in continuous fiber lengths (1000s of km for example) to be filament wound, woven, laid up, processed in rows or bundles, used for thread or yarn to produce a range of products requiring the enhancement from the nanofiber additions. The polymer matrix is a system that can easily be processed into various shapes or with other polymer systems or non-polymeric additions. The NCFs are a system that can deliver aligned nanotubes for strengthening (including improved impact strength), or electrical or thermal anisotropic features (properties varying in different directions). By extension, the NCF system can also be applied to nanofibers embedded in matrix and then formed into a tape or film to provide control of distribution and alignment and to enable a variety of subsequent processing steps.

The present invention relates to the development of a nanofiber reinforced polymer composite system with control over the orientation of the nanofibers dispersed in the system. The system is a nanofiber continuous fiber system where nanofibers are embedded in polymer matrices in micron size fibers. Nanofibers are carbon fibrils with diameters in the 100 nm and less range, multi-walled nanotubes (MWNTs) and single wall nanotubes (SWNTs), including ropes and their various derivatives with a range of functionalizations, which can be, but are not always, exclusively carbon. Through a polymer/nanofiber mixing, induced orientation of the nanofibers can be processed into a range of micron size diameter fibers that enable nanofibers to be used to enhance mechanical, thermal and electrical properties. It can include a nanotube system, where NCFs are made up of nanotubes without a polymer binder. The nanotube continuous fibers would originate from a nanotube/polymer precursor system where the polymer has been removed leaving micron size fibers of only nanotubes. The NCFs can be prepared with isotropic dispersions of nanofibers or with highly aligned nanofibers that can easily be handled and processed with conventional composite manufacturing technologies to deliver high performance structures. This method of producing nanofibers in a continuous polymer system could have highly dispersed nanofibers or a range of dispersion conditions to suit special property needs. Polymer systems are expected to be those, which can undergo high shearing and elongational flow conditions including, but not limited to block copolymers, various thermoplastics, liquid crystal polymers, thermosets, gel processed polymers and elastomers. Rheological studies identified the key steps to dispersing both VGCFs and SWNTs in polymers. A number of suitable polymer/nanofiber systems exist, including but not limited to: Acetal, ABS, ASA, PE, PEEK, PET, PP, and Epon epoxy. For some applications epoxies and resins may be desired. Using the methods of the present invention which control the orientation of the nanofibers, materials can be prepared with specifically enhanced structural, electrical, and thermal properties. The NCFs provide a delivery system or package for handling nanofibers, and specifically SWNTs. The NCFs are a structure in and of themselves, a material useful for further processing into other forms, and a method of aligning nanofibers. The NCFs can be effectively used to process a range of composite forms including weaves, mats, plies, filament wound tubing and vessels and for a range of applications including wires and electrostatic discharge materials.

The invention extends to further processing of the nanofiber composites. To achieve the full potential of nanotubes for micro to macro scale applications such as wiring and interconnects, single wall nanotubes (SWNTs) can be developed into fully integrated nanotube composites (FINCs). Full integration of nanotubes requires their development beyond conventional composites so that the level of the non nanotube material is designed to integrate well with the amount of nanotubes so that the nanotubes are part of the matrix rather than a differing component. This development of multifunctional materials from nanotubes, produces fully integrated nanotube composites (FINCs), a nanotube hybrid material system designed to surpass the limits of rule of mixtures engineering and composite design, implementing designs to fully mimic nanotubes on larger scales. This new approach involves integration, dispersion and alignment, functionalization, and polymerization to achieve total integration. Some cases achieve conduction through well designed networks but the goal is conduction through chemistry. The material systems described in this invention have application as highly conducting plastic wires and interconnects for multifunctional device and electronic applications. The basis for these materials will be nylon, PMMA, and conducting epoxy. Producing FINCs with gas permeable polymers provides new gas sensor capabilities. Key applications will be the lightweight multifunctional interconnects for electronics and wiring.

The invention further outlines applications for the full integration of nanotubes. The lengths of SWNTs are such that toughening can easily be achieved and our calculations indicate that processing beyond rule of mixtures approaches is necessary to gain the full potential of the SWNTs. The invention and methods produce toughened-fully integrated nanotube composites (T-FINCs), a nanotube hybrid material system designed to surpass the limits of rule of mixtures engineering and composite design, to implement designs to fully mimic nanotubes on larger scales for enhanced mechanical properties. The basis for these materials will be two standard polymers: polypropylene (PP) and nylon. Shielding systems in the forms of panels and woven shields are typical applications for the new materials. Nanotube shielding has a wide range of applications, as intermediate bumpers and rear wall panels, extending to hypervelocity impact applications and shielding for space applications.

Material systems (in sheet form) are produced that see ten orders of magnitude drop in electrical resistivity when using VGCFs and fourteen orders of magnitude drop in electrical resistivity when using SWNTs. The 10 wt. % SWNT material has been used to produce the first of our wire systems and has an electrical resistivity in the 600 ohm-square range. These systems have highly dispersed nanofibers otherwise the percolation would be even lower (when a segregated network is used).

Enhancements have also been seen in improved stiffness (as high as 350% for VGCF systems), increased strength (50% increase for the 10 wt. % SWNT material) and with 100% elongation to failure for the SWNT system with the highest loading of nanotubes of 10 wt. %.

Specific fibers are made from ABS with 10 wt. % VGCFs, PE with 5 wt. % SWNTs, Pe and PP with 1-3 wt. % HiPco, or other SWNTs. Alignment of VGCFs and SWNTs is observed. The ability to make composite fibers extends to making T-FINCs in fiber form.

BRIEF DESCRIPTION OF THE DRAWINGS

FIG. 27 shows desired nanofiber alignment by inducing directionality by shearing and or elongational flow into fibers.

FIG. 28 shows nanofiber dispersion issues where the initial preparation of the nanofibers influences the degree of alignment and dispersion obtained fibers.

FIG. 46 shows a comparison of a stress-strain curve for (a) a typical epoxy composite compared to that for (b) a nanotube composite where significant strength of the nanotube is discarded. SWNTs are expected to have a high degree of elongation to failure.

FIG. 47 shows parameters used to calculate the properties of SWNT composites by Rule of Mixture Calculations based on an ABS polymer as the matrix.

DETAILED DESCRIPTION OF PREFERRED EMBODIMENTS

NCFs are a continuous fiber system, typically in the 1 to 150 micron diameter size range, made up of polymers and nanofibers, where the composition of the nanofibers range from above zero to 100 wt. %. Processing of nanofibers into polymer matrices in a continuous fiber form will provide control over the nanofiber orientation and offer advanced properties compared to conventional materials. The structural, electrical and thermal properties can be significantly enhanced. NCFs made up of 100% nanofibers are to be processed by mixing with a polymer matrix or binder that is subsequently removed to leave a nanofiber system. This process of making 100% micron size NCFs is especially directed toward development with SWNTs and their various functionalized derivatives.

Currently, nanofibers are not easily handled or manipulated into various engineered forms for a range of scales. Nanotubes can be obtained in low and high purity dried paper forms, called "Bucky Paper," or may be purchased in various solutions that do not easily lend themselves to processing large scale products. Nanotubes are also available in the as-processed, unpurified condition which carry with them numerous unwanted impurities that affect composite properties. In this disclosure, a form of nanotubes is presented which can easily be handled in much the same way as thread, yarn, fabrics, etc. are handled. The processing to achieve this end involves dispersing nanofibers in polymeric matrices that are formed into continuous fibers. The method of forming the fibers involves high shear processing, where polymers are a liquid, molten or melted and extruded through small orifices to produce high shear and small fiber systems. Elongational flow is subsequently used to further reduce the size of the fibers and to ensure aligned nanofibers (aligned parallel to the length of the continuous fiber system). NCFs using vapor-grown carbon fibers have already been processed using ABS with 10 wt. % nanofibers and PE matrices with 2, 5 and 10 wt. % nanofibers. NCFs have also been processed using ABS with 5 and 10% wt. % SWNTs and using UHMW (ultra high molecular weight) PE with 2% wt. % SWNTs. Additional systems produced included PP 1000 and 12 wt. % SWNTs with nanotube concentrations up to 6 wt. %.

Spools of NCFs can be manufactured to use in the as-received form, or may be designed to further activate, functionalize, surface treat, pyrolize, modify, cross link, etc. the fiber system. Through chemistry, the nanofibers may be further linked to the polymer, to each other, or optimized for non-wetted or unbound conditions according to the needs of the specific application. The ability to provide for aligned nanofibers in a range of polymeric materials and to further chemically treat the fiber systems opens a range of opportunities for new product development and materials enhancement. This includes the processing of FINC and T-FINC fibers.

Figure 1A:
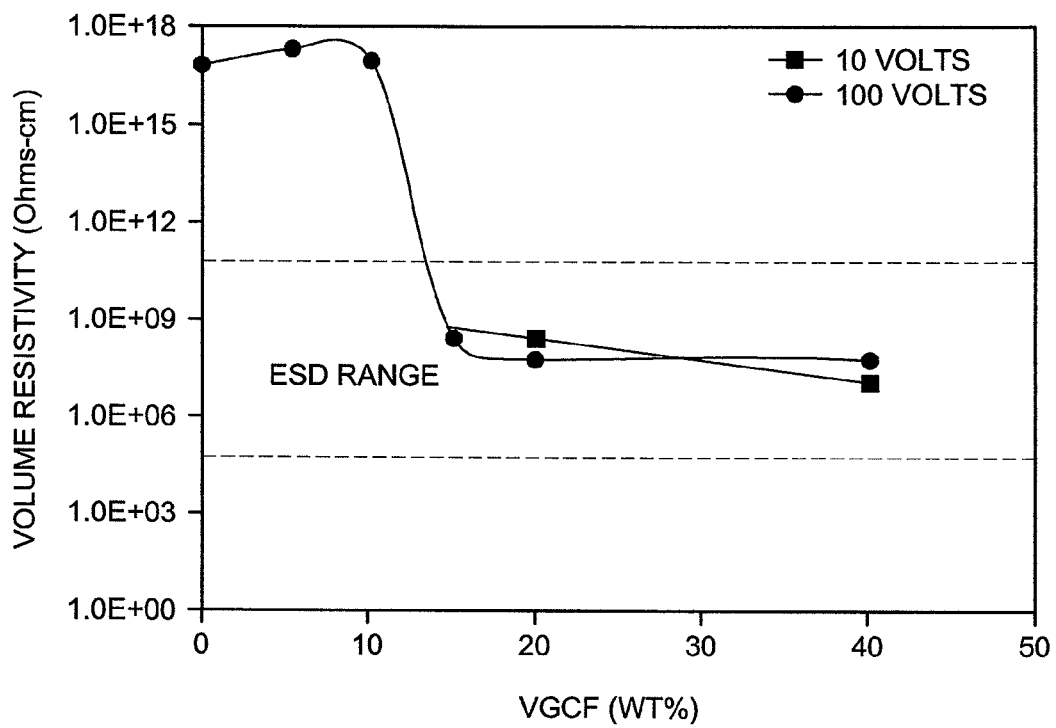
FIG. 1 shows (a) volume resistivity versus carbon nanofiber content VGCF (in wt. %) in the PP matrix at room temperature, and (b) surface resistivity versus carbon nanofiber content (in wt. %) in the PP matrix at room temperature.
Figure 1B:
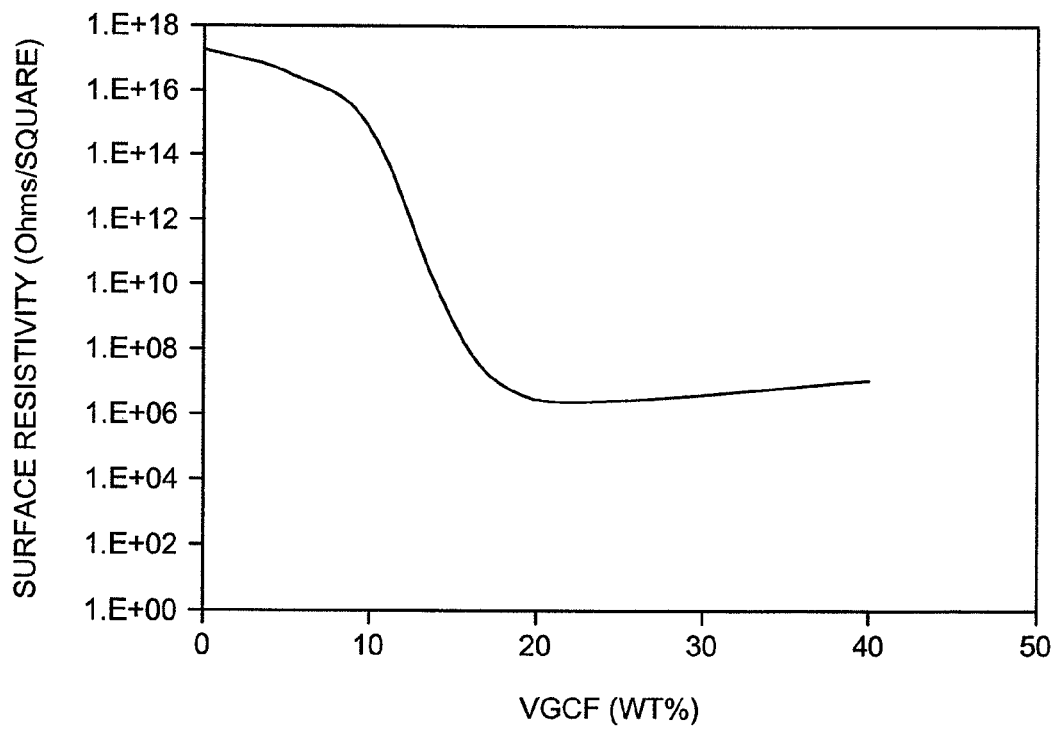

For an application relating to electrical properties conducting polymers, composites can be processed with isotropic dispersions of nanofibers when a network is formed. The material may be designed for Electrostatic Discharge (ESD) applications, primarily used to prevent the buildup of static electrical charges. Static electricity is not current or flow electricity; rather it is electricity that is at rest. The static dissipative range is known to be between an insulator (surface resistivities higher than $10^{13}$ ohms/square) and a conductor (surface resistivities lower than $10^5$ ohms/square). That is, values of surface resistivity between $10^5$ and $10^{12}$ ohms/square will provide static electrical dissipation. The values are low enough to provide dissipation, but not too low where sparking can occur. The volume and surface resistivities of the isotropic nanofiber reinforced composites were measured. The results of the isotropic composites are plotted in FIG. 1 for (a) volume and (b) surface resistivity, respectively. A percolation threshold occurs as it is expected for plastic reinforced with conductive materials. The nanofiber reinforced polypropylene composite starts to percolate at around 9%, and by 18%, a network of fibers has been formed with no further decrease in resistivity. This system with this level of percolation has the opportunity of providing strengthening over other filled polymers for ESD, where the filler networks only lead to ESD properties.

To extend the range of that isotropic material, the conducting polymers can be processed into NCFs, where the nanofibers are well-aligned and can easily be aligned in bulk form by easy handling of micron size fibers. The material, which has highly anisotropic electrical properties, has the further potential of being used as an Electromagnetic Interference/Radio Frequency Interference (EMI/RFI) material, since the electrical conductivity can be processed to a higher electrical conductivity. The nanofiber network that is formed is highly aligned parallel to the length of the fibers. An EMI/RFI material has electrical resistivities in the conductor range (<10.sup.5 ohms/square) and can even be used for wires and electrical interconnects particularly when SWNTs are used. The interconnected network for conduction is maintained but the high degree of alignment further enhances the electrical properties and strength.

Figure 2:
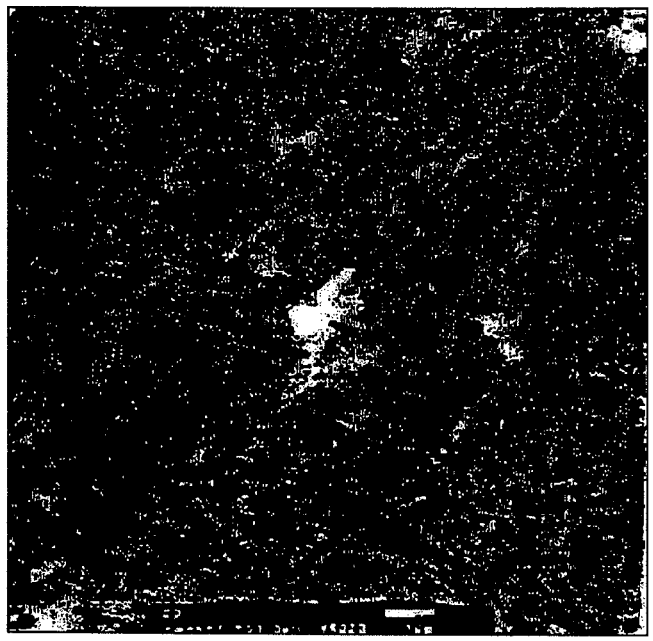
FIG. 2 is a TEM micrograph of a 20% carbon nanofiber reinforced PP composite from which isotropic dispersion of the individual fibers can be observed.
Figure 3:
FIG. 3 are SEM micrographs of a 10% carbon nanofiber reinforced PP composite in which wetting of the fibers by the PP matrix can be observed.

The processing method used in the present invention to incorporate the nanofibers in the plastic matrix was a Banbury-type mixing where high shear stresses and high power were incorporated into the system. Given the size and tendency of agglomeration of the nanofibers, the Banbury-type mixing was selected to provide a uniform distribution of the nanofibers by exposing the agglomerates to hydrodynamic stresses forcing the agglomerates to break apart without, in most cases, damaging the nanofibers. In some cases, high shear can be used to shorten the fibers, particularly those with a high number of defects. Composites with carbon nanofiber concentration ranging from 0-60 wt. % were prepared demonstrating the high degree of fiber concentrations that can be achieved. Nanofiber/tube dispersion is a key aspect in the sample preparation, since the physical properties of the finished composite are strongly governed by the dispersion of the fibers in the matrix. FIG. 2 shows a transmission electron microscopy micrograph of vapor grown carbon fibers in a polypropylene matrix. These nanofibers with an average diameter of 100 nm are highly dispersed and there are no indications of porosity in the composite system. FIG. 3 shows the scanning electron micrograph of a fracture surface of a composite sample tested in tension showing regions of wetting as indicated by the deformation of the polymer around the nanofibers.

Figure 4:
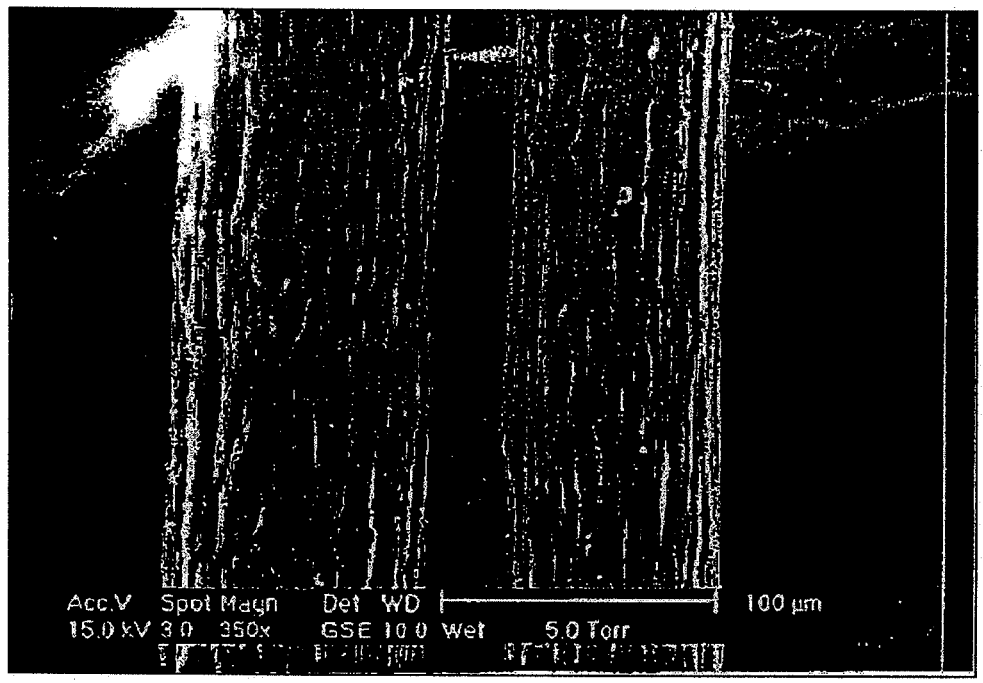
FIG. 4 is a comparison of two micron size fiber composite diameters.
Figure 5:
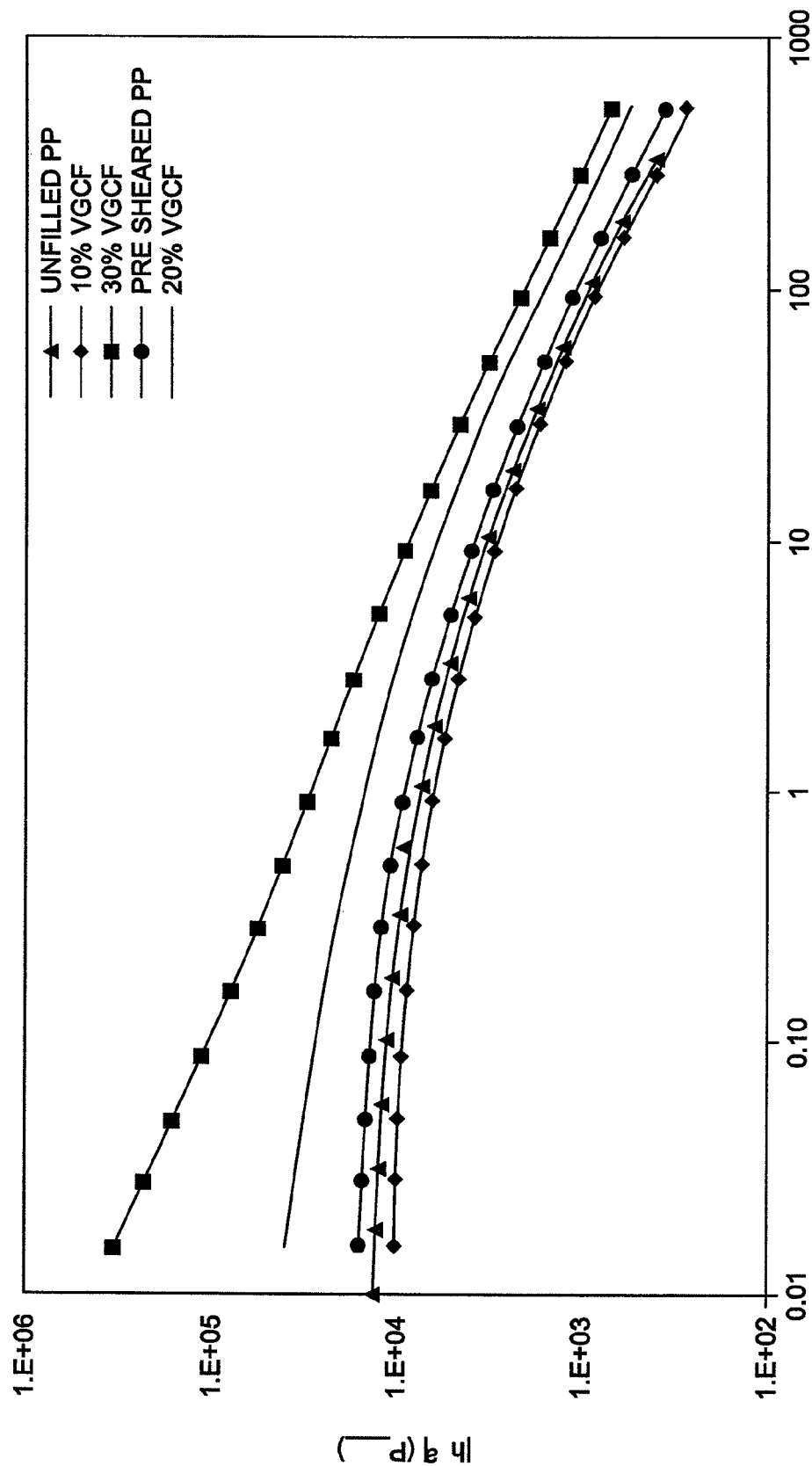
FIG. 5 shows viscosity versus shear rate for various concentrations of VGCFs in a polypropylene matrix demonstrating the reduction in viscosity with increasing shear rate.
Figure 6:
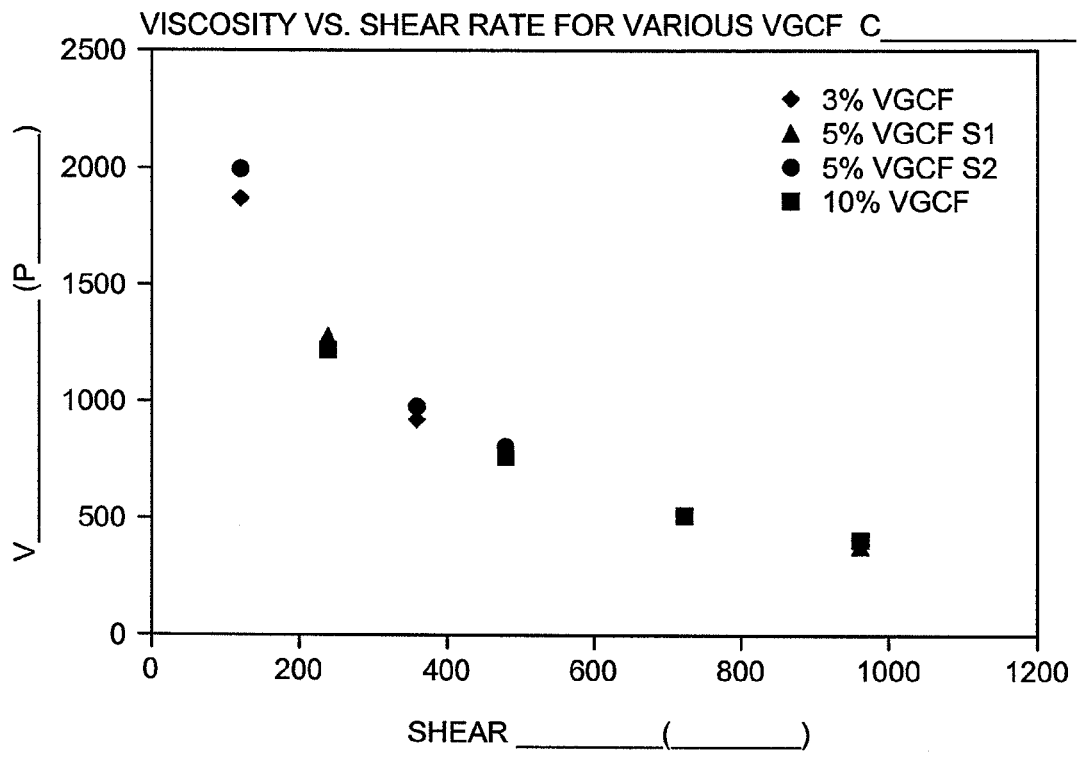
FIG. 6 shows the change in viscosity with increasing shear rate for 3, 5 and 10 wt. % VGCF-polyethylene systems.

The NCFs were obtained by subsequently processing the composite material in a high shear condition using a capillary rheometer. In the rheometer, the viscosity of the polymer/nanofiber system is significantly reduced to promote easy processing and high degrees of alignment. FIG. 5 shows the reduction in viscosity that can be accomplished as shear rate is increased for a VGCF-polypropylene system. The degree of alignment is processed into the micron size fiber system according to the level of shear used (see FIG. 4 for micron size fiber composite). FIG. 6 shows a similar reduction in viscosity obtained with increasing shear taken from the capillary rheometer where high degrees of alignment of the nanofibers are achieved. The degree of wetting and bonding can be processed into the initial NCF or may subsequently be altered following NCF assembly into various parts.

To achieve NCFs polymer mixing procedures were developed to achieve high SWNT dispersion with reduced tangles. The rheology of mixing and melt spinning was studied. Continuous polypropylene (PP) and Polyethylene (PE) fibers with and without single wall nanotube (SWNT) additions were produced at lengths of thousands of kilometers (quantities which could easily be spooled on bobbins or spools). Aligned SWNTs were observed in nanotube continuous fibers. Improved fiber properties were demonstrated via a rheology study, thermophysical analyses, microscopy, and mechanical testing. Improved properties included strength higher than the unfilled fibers, improved modulus, significant changes in glass transition temperature and degradation temperature, and indications of sustained strength at high temperatures. The addition of SWNT increased the tensile strength by 743% and the elongation to failure by 2964% for the fiber forms. Production equipment was built including an elongational flow apparatus and a take up wheel system.

The identified mixing approaches are successful for producing highly dispersed SWNTs in polymers where porosity and mixing viscosity is not an issue (typically high shear conditions). The process outlined in this invention identifies below key factors for achieving alignment, to producing continuous fibers, and for producing small diameter fibers.

As-received SWNTs do not produce the same results as purified SWNTs in polymer systems. Initial polyethylene (PE) with as-received SWNTs were evaluated and showed to be poorly mixed. The amorphous carbon and impurities limited the mixing. ABS was processed with 10 wt. % SWNTs as a test system. The mixing procedure was augmented to use ABS powder rather than pellets. Powder provides for the best initial dispersion level of nanotubes once they were dispersed over the powders uniformly. Powder was dried and mixed with purified SWNTs in toluene. The slurry was dried where all the solvent was removed. The dried material formed chunks of agglomerated powder with highly dispersed nanotubes that were very easy to handle. A composition of 5 wt. % SWNTs in ABS was processed using the torque rheometer. The composite was hot pressed into a sheet for subsequent processing. The sheets showed good flexibility and could be cut into pieces without cracking. The VGCF/polymer composite systems would many times crack when sectioned from the sheet form. PP and PE were processed with dispersed as-received and purified SWNTs.

Polymer powder mixed with SWNTs in solution route proved to be an optimal approach for dispersing nanotubes in a polymer. PE powder was used but polymer pellets were used for the PP. The solvent was dimethyl formamide (DMF) since it has a low solubility in PE and PP, adequately disperses SWNTs and it boils off at a temperature below the softening temperature of the polymers. The coverages were uniform and this method provided a step where unwanted impurities in the as-received SWNT material (whether as-received or purified) could be removed. Unwanted contaminants had to be removed even after purification of the nanotubes. These powders formed agglomerates upon drying and the chunks were easy to handle and removed concern of having airborne particles. The agglomerates loaded very easily into a torque rheometer for mixing and compounding. Mixed composite was easy to process without any significant increase in torque (this means at low viscosity). Although the viscosity increases with the added SWNTs, the torque requirements for mixing the material are over an order of magnitude lower than the instrument limitations. When mixing the PP (melt flow index of 12) and PE (melt flow index of 10) materials, the torque conditions were the lowest observed.

SEM analyses showed the SWNTs in the PP and PE to be highly dispersed, to have a lesser degree of entanglement, and to have some indication of wetting. The composite was porosity free. Compositions of 0.5 wt. % as-received SWNTs (Tubes@rice) in PE (melt flow index of 10), 0.2 wt. %

Figure 7:
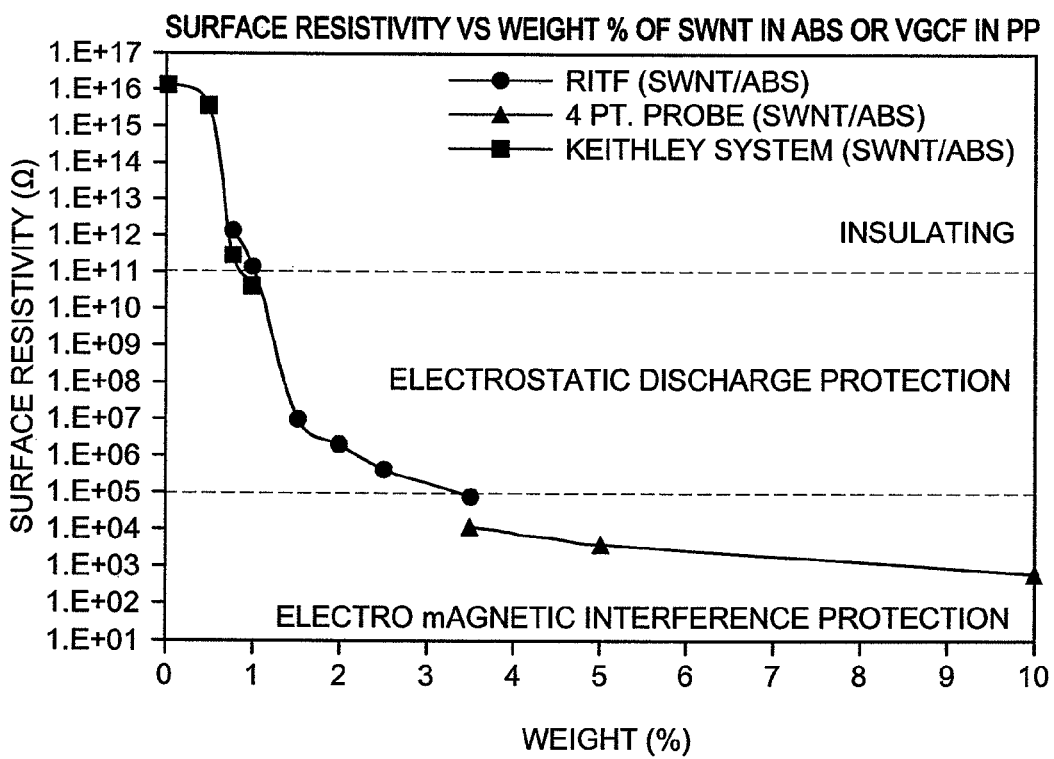
FIG. 7 shows electrical resistivity as a function of SWNT composition.

SWNTs from HiPco in PP1000 and PE ultra-high molecular weight, and 1.7 wt. % SWNTs from NTT in PP12 and 3 wt. % SWNTs in PE10 were used. The 10 wt. % SWNTs from Tube@grice in ABS were processed to learn more about the mixing process and the electrical properties of these systems. Typically a concentration of 1 wt. % SWNTs well dispersed in a matrix will lead to electrostatic discharge (ESD) conditions. It is likely that any concentration less than that that produces conduction is likely to be a segregated network. FIG. 7 shows electrical resistivity as a function of SWNT composition. It is expected that the matrix does not play a significant role in the current processing methods.

Figure 8:
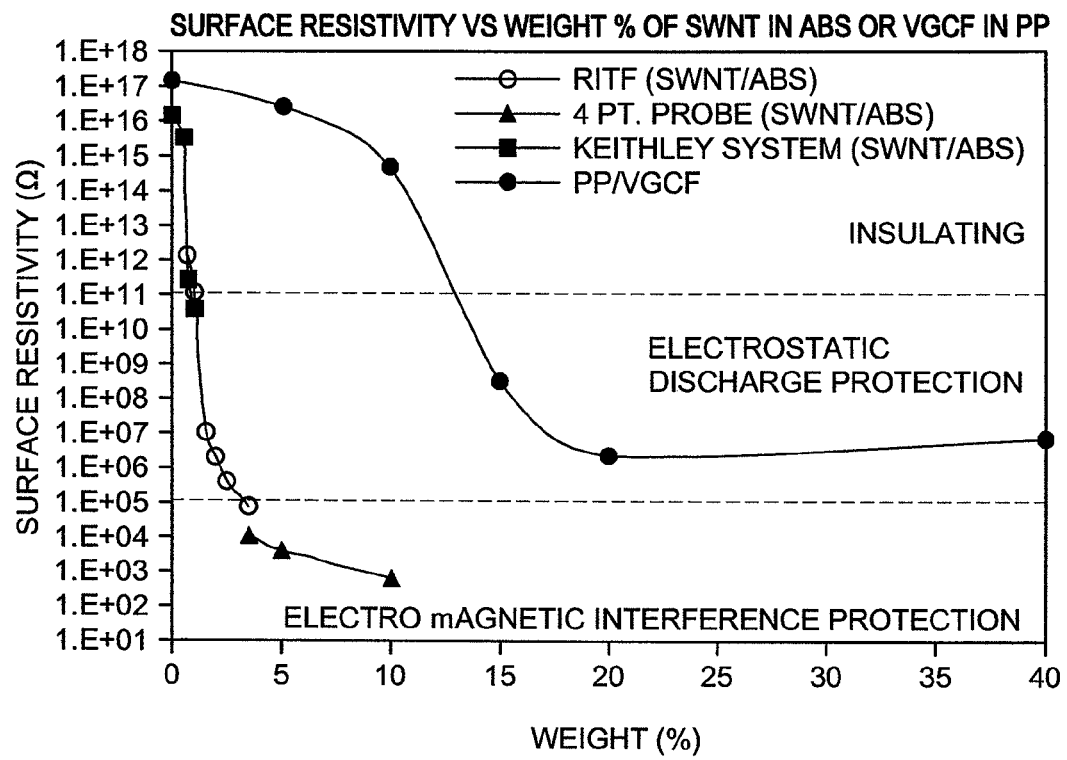
FIG. 8 shows surface resistivity of ABS with VGCF and SWNTs.

The processing route using powders and SWNTs in solution works very well and all compositions processed to date show good matrix/nanotube properties. These enhanced materials (the as-prepared aggregate and the mixed composite sheets) and nanotube coated powders, composite prepreg, and final sheet material can be provided for end use or further processing. Fibers have been produced from various systems. Long continuous fiber forms, and over a 1000 meters of fiber were produced. FIG. 8 illustrates the surface resistivity of ABS with VGCFs and SWNTs. Note that only 1% SWNTs are needed to achieve conduction from a well dispersed composite system.

There are a number of ways to achieve conduction via SWNTs. First, a network must be established and maintained in the polymer. Second, when alignment is achieved, either end to end contact or tunneling across small gaps must occur. Alignment that leads to high dispersion and no contacting nanotubes may result in poor conduction. The nanotube ropes are useful for achieving conduction because they lead to a high aspect ratio filler. The metal in the HiPco nanotubes will also contribute to a reduced percolation threshold for conduction.

Figure 9:
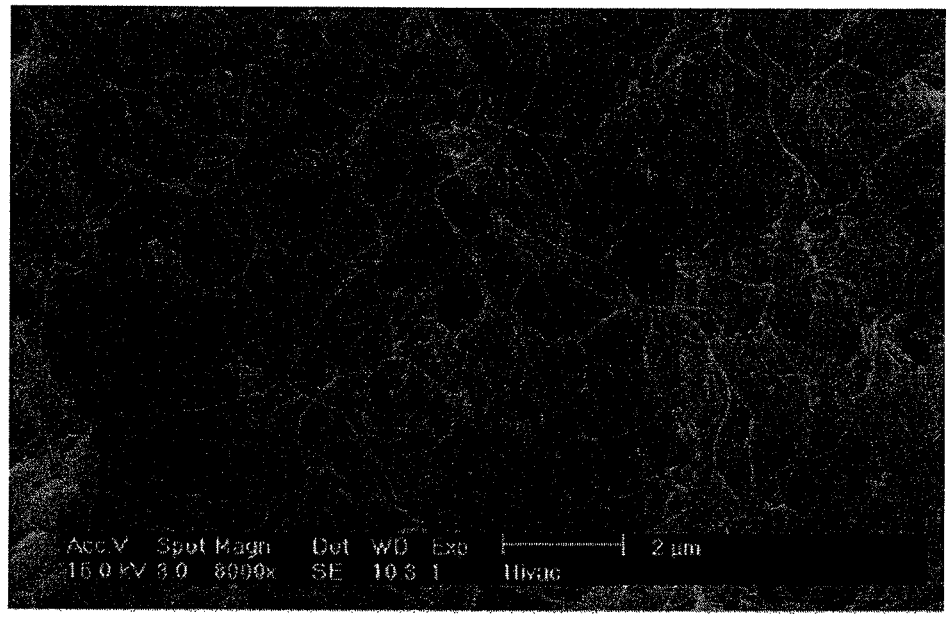
FIG. 9 shows a micrograph of a 10 wt. % SWNT/ABS polymer fractured at room temperature.

From various mixing runs and from measurements of the peak and steady-state torque for each run, the average and peak torque levels for composite processing were determined. Data showed that the mixing conditions were far lower than the limits of the torque rheometer and that the mixing viscosity was significantly lower than other investigators had encountered. A viable commercial approach to producing nanotube composites at low costs is achieved by the present invention since the Banbury mixing is already a low cost commercial manufacturing method. Only costs added besides that of the SWNTs is the cost of the solvent. Water or other low costs solvents or surfactants are part of the future work. FIG. 9, a micrograph of a 10 wt. % SWNT/ABS polymer which was fractured at room temperature shows good dispersion, absence of porosity, and the reduced entanglement of the nanotubes. The degree of entanglement is reduced since the high shear processing during mixing aids in dispersing the nanotubes from each other. SWNTs are wetted by the polymer, as indicated by places where nanotubes appear to be pulled out of the polymer. Some nanotubes are not coated by the polymer, indicating that the fiber/matrix shear strength and normal stress are still relatively low.

PP with the following formula was used in this project: —CH.sub.2CH(CH.sub.3)-]n (1) that was (1) isotactic, Melt flow index 1000, melting point of 160.degree. C., and density of 0.900 and (2) isotactic, Melt flow index 12, melting point of 165.degree. C. and density of 0.900. PE with the following formula was used in this project: (—CH.sub.2CH.sub.2-)n (2) that was (1) ultra-high molecular weight, melting temperature of 130.degree. C. and density of 0.940 and (2) Melt flow index 10, Marlex from the Phillips Co., density of 0.94. PP1000 was not an optimum polymer to use for melt spinning but it was used to explore the limits of process rheology. The ultra high molecular weight PE was also not optimal for melt spinning but could be mixed with the SWNTs by a gel-spinning approach and thus show the extension of the process of this invention to gel-spinning applications. Polymers were typically prepared by drying in a hot box at 90-100.degree. C. The slurries of SWNTs, and polymer were dried in a furnace at temperatures below the melting temperature of the polymers to remove the solvent. The resulting materials were polymers overcoated with an even distribution of nanotubes. This step provided the initial dispersion condition and one that would lead to easier dispersion of the nanotubes during the mixing of the melt. Numerous mixing runs of the polymer systems were prepared to provide for extrusion, use in the capillary rheometer, rheology, tensile testing, and thermal analysis. The materials were cut into pellets for subsequent extrusion or use in the capillary rheometer.

Figure 10:
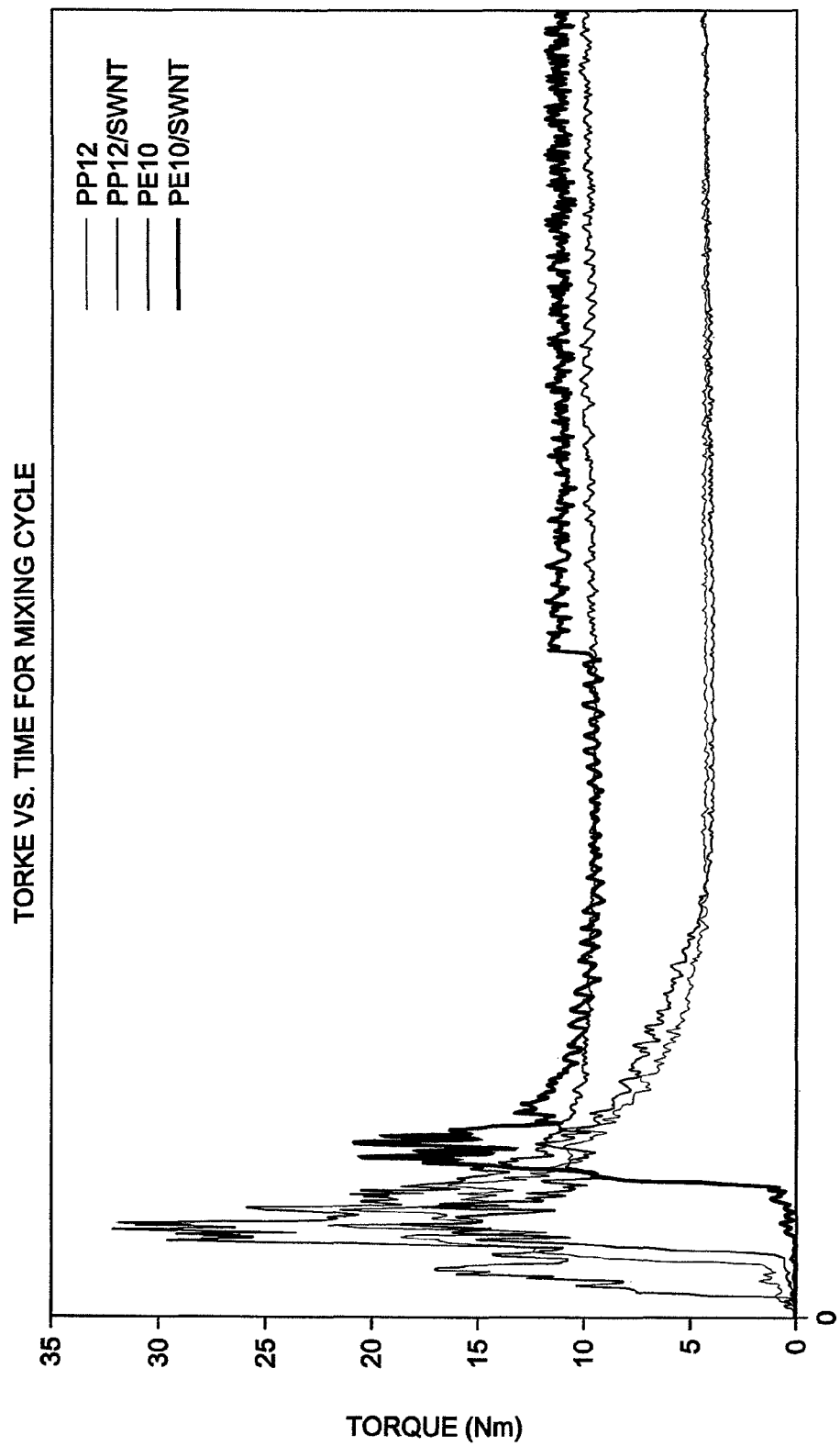
FIG. 10 shows torque data for the PP12 and PE10 systems.

The mixing conditions for the polymers with SWNTs were at torque conditions far below the limits of equipment shutdown (Haake Polylab rheometer). FIG. 10 gives torque data for the PP12 and PE10 systems which show very low values of torque indicating that mixing has no problems with excessive viscosity as reported by others. Note that the torque is relatively low and very steady state once the initial mixing was conducted. In some cases, mixing speeds were ramped up from 60-65 rpm to 90 rpm to enhance mixing. The mixing parameters including temperature, time, and mixing rate were selected based on a process optimization study and on a database for Banbury mixing of thermoplastic polymers. The mixing and the extrusion could be accomplished in a multiple zone compounding extruder where the mixing residence could be held for sufficient time followed by extrusion of a well dispersed SWNT system. This provides a cost effective approach to making continuous fibers.

Figure 11:
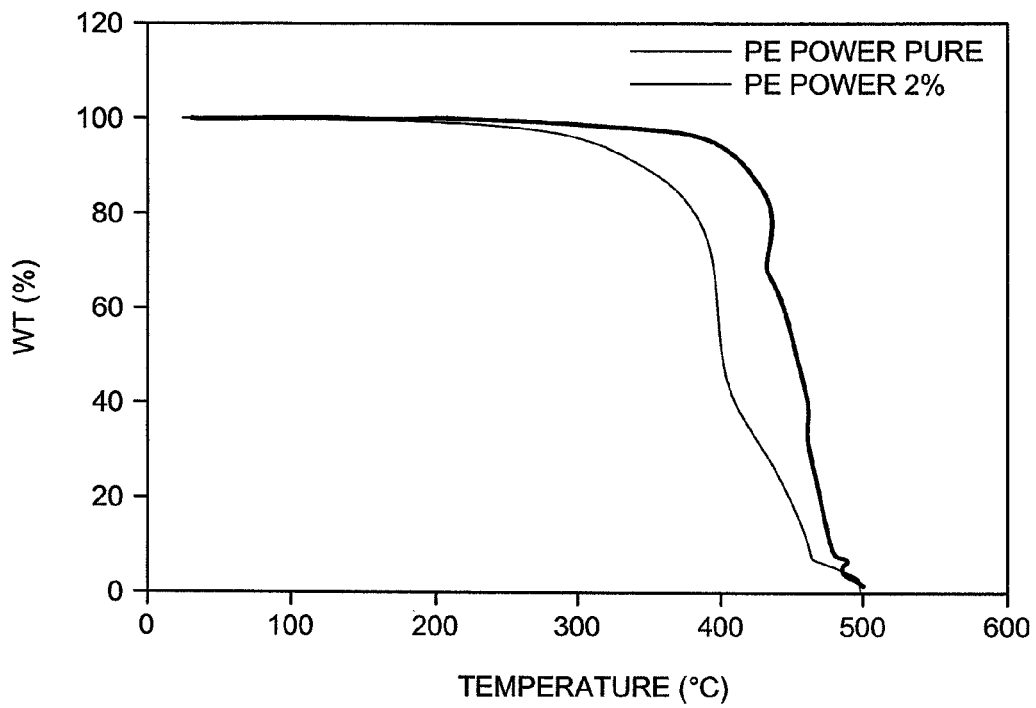
FIG. 11 shows the significant, 100.degree. C. higher, increase in the degradation temperature for PP with just 2 wt. % SWNTs.

Thermal physical measurements and rheology were conducted on the polymer blends. Thermal degradation, creep behavior, storage modulus as a function of temperature and frequency were all measured. The change in the glass transition temperature, where applicable, was also measured. PP and PE saw increases in the degradation temperature with SWNT additions. These improvements are significant to the polymer industry since only small amounts of SWNTs led to these increases. FIG. 11 shows the significant, 100.degree. C. higher, increase in the degradation temperature for PP with just 2 wt. % SWNTs.

Figure 12:
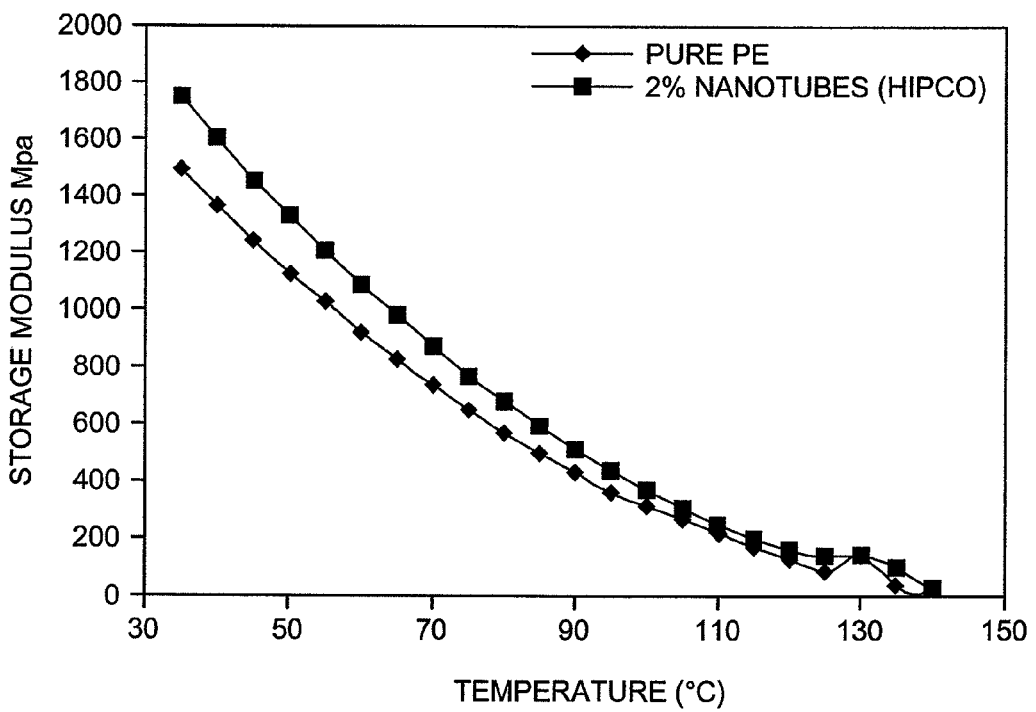
FIG. 12 shows the increase observed in the modulus of polymers when SWNTs are added.

Early studies worked with compositions of 1-10 wt. % in ABS. Small compositions usually around 2 wt. % ensured the processing of multiple runs for use in several polymers. Some of the small concentration samples were in part, amorphous carbon and catalysts since they were used to ensure numerous runs. Compositions shown on plots identify the composition of added nanotube material whether they were purified or not. FIG. 12 shows the type of increase observed in the modulus of polymers when SWNTs are added. Although this change for PE appears small (25%), the potential for creating a tough fiber exists over that seen for dispersed VGCFs due to remaining elongational properties of this polymer system.

Figure 13:
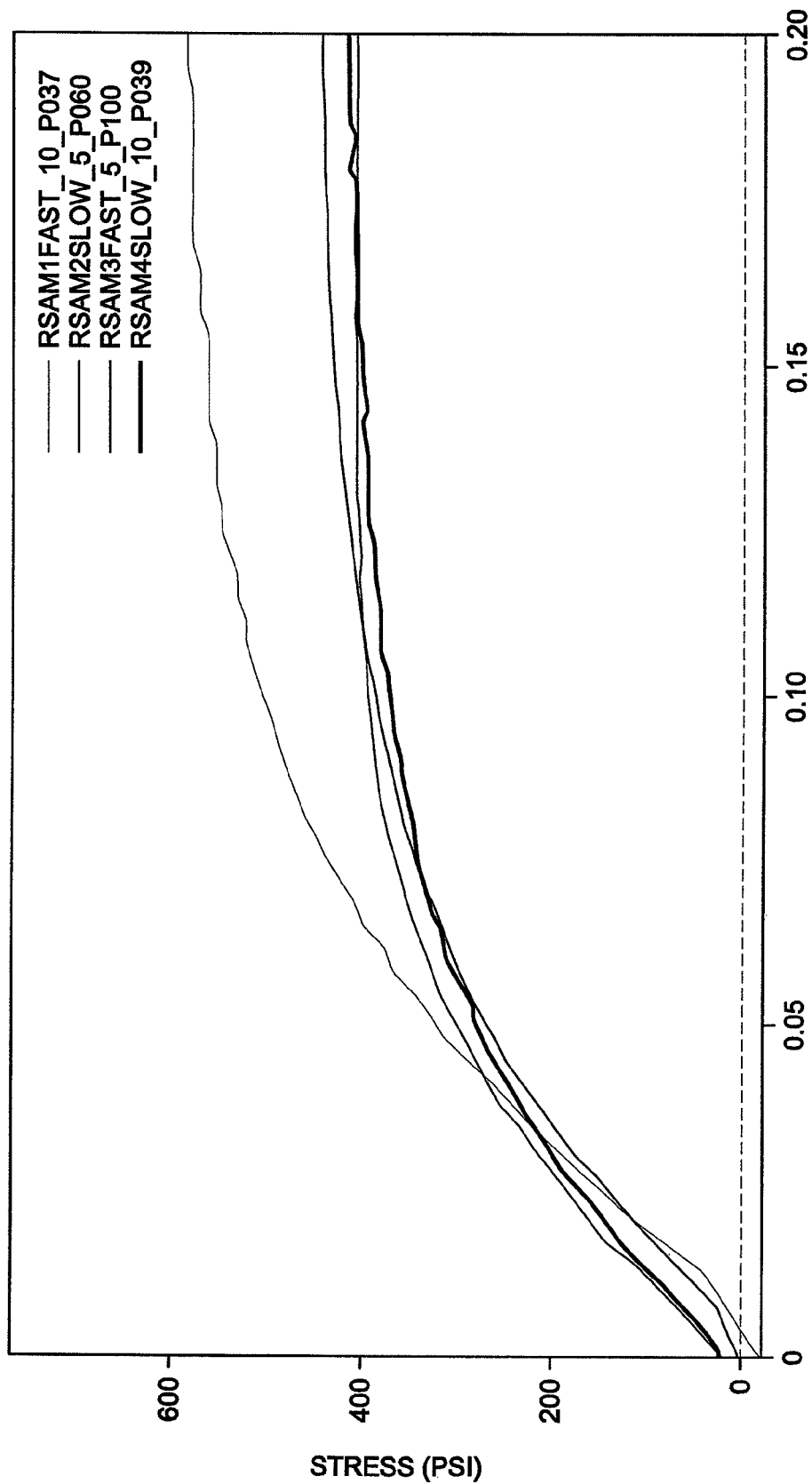
FIG. 13 shows property enhancement due to high extruder speed and take up speed.
Figure 14:
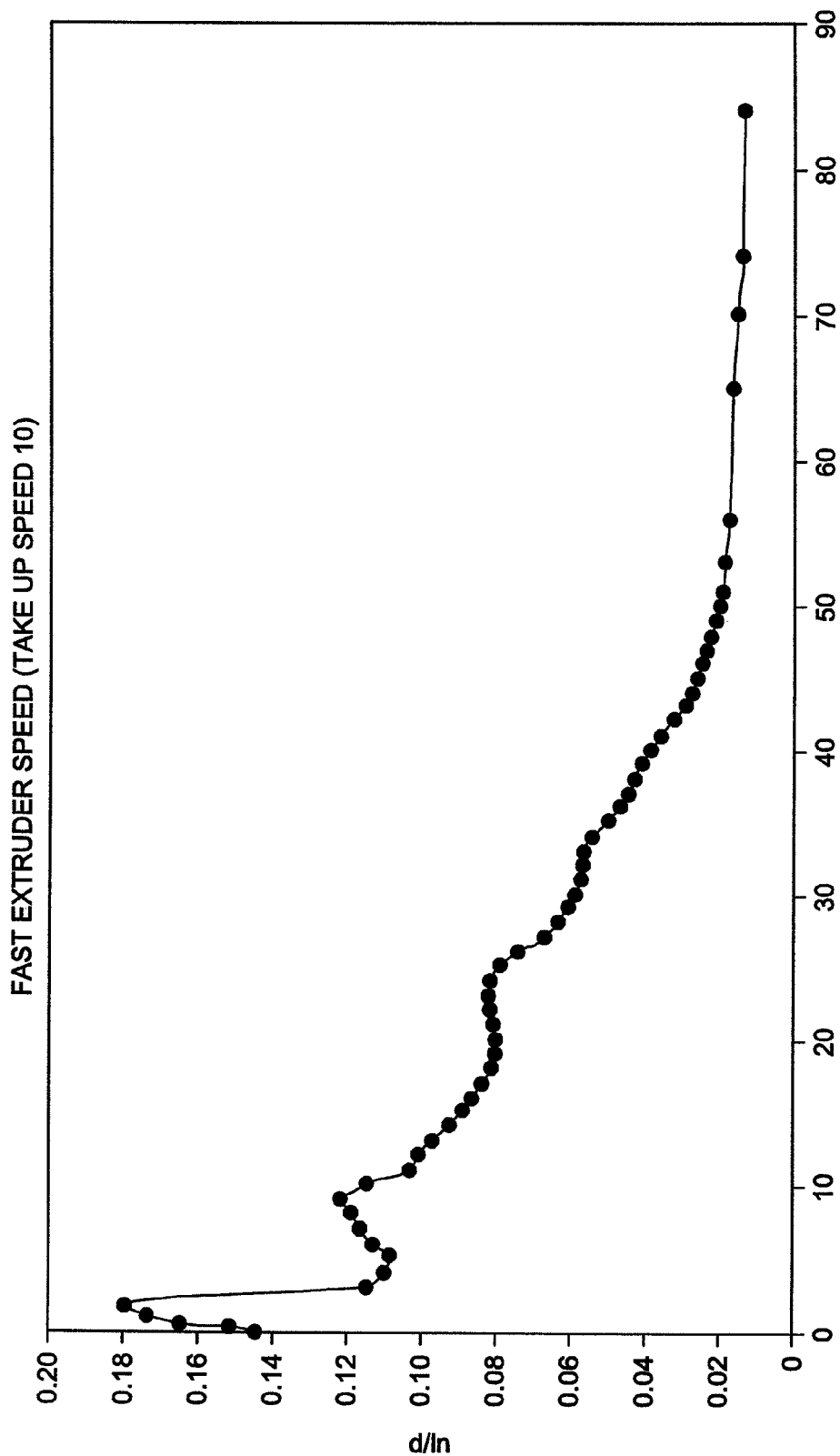
FIG. 14 shows strength of fibers processed at different speeds.
Figure 15:
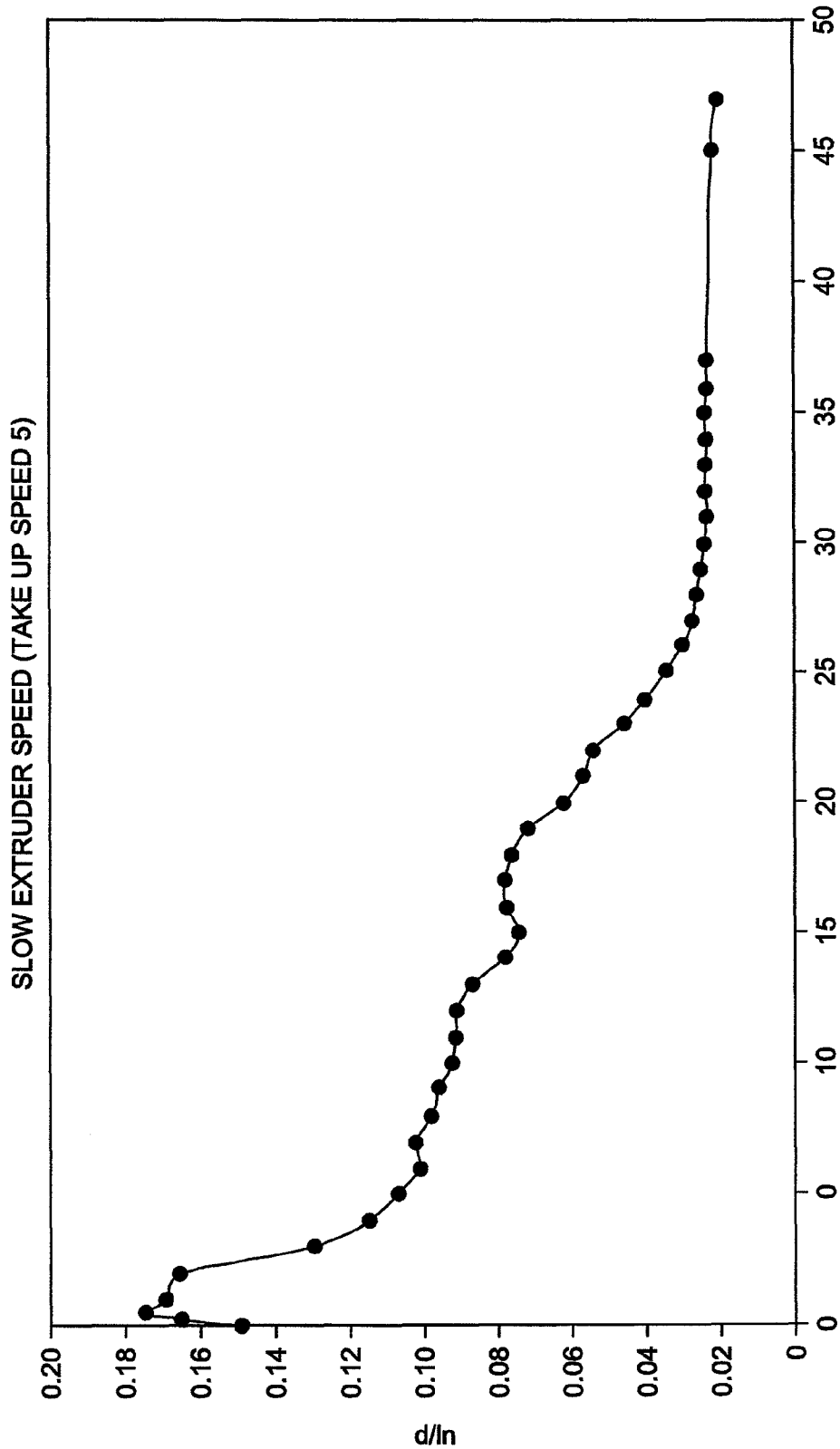
FIG. 15 shows a plot indicating the change in diameter of a fiber system at slow extruder speeds and subsequent slow take up speeds.

It is known in the art of fiber spinning that selection of extrusion speed and subsequent draw speed (allowed elongational flow) effect general fiber properties especially final fiber size. FIG. 13 shows the enhancement in properties that would be obtained if high extruder speed and take up speed are used. FIG. 13 details the strength of various fibers when processed at different extruder and take up speeds. High extruder speed coupled to high take up speed leads to stronger fibers. It is also known that use of a fast extruder speed with a take up speed that is high can lead to very small diameter fibers. FIG. 14 shows the fiber sizes for these processing conditions, more particularly a plot indicating the change in diameter of a fiber system when processed at high extruder speeds and subsequent high take up speeds. Small diameter fibers are sought since defects in these systems tend to be minimized. Further, use of a slow extruder speed with a slow take up speed leads to larger diameter fibers as seen in FIG. 15. FIG. 15 provides a plot indicating the change in diameter of a fiber system when processed at slow extruder speeds and subsequent slow take up speeds. Larger diameter fibers result. Thus a range of fiber sizes can be processed according to customer needs.

Fibers were analyzed using optical microscopy and SEM and were observed in some cases to have aligned nanotubes. The samples with compositions greater than 1 wt. % purified SWNTs were considered either ESD or EMI conducting. The samples with compositions greater than 2 wt. % purified SWNTs were EMI. The 10 wt. % sample was highly conducting and could be used as a plastic wire. A thick plastic wire was placed in an electrical circuit to light up LED's when powered by a DC power supply. This demonstrated a significant application for these new fibers that are being produced according to the invention.

Figure 16:
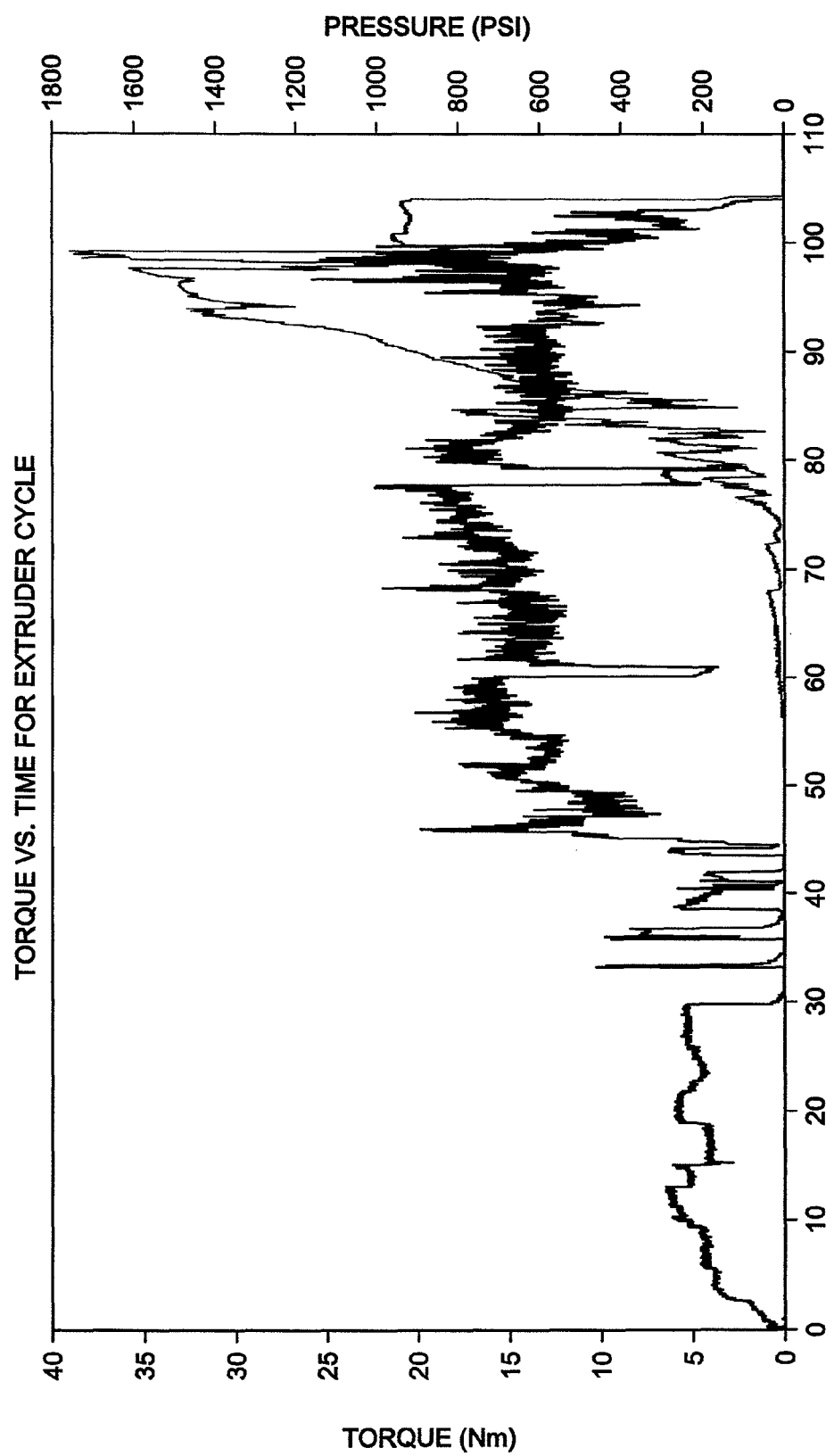
FIG. 16 shows extrusion data collected while producing fibers from a Haake extruder.

Both an extruder and a capillary rheometer were used to make fibers in this period of the program. A Stratasys Fused Deposition Modeling system could also be used to make continuous fibers. Shown below in FIG. 16 is the extrusion data collected while producing fibers from a single bore Haake extruder. Fibers were processed with the extruder. Using the extruder, one must consider die size, screw rate, and extruder temperature as well as the take up speed when the fibers are drawn out of the extruder. Processing must be at a condition where additional drawing out of the fiber can occur. A Rosand RH7 capillary extrusion rheometer, was used to investigate the rheological behavior of nanotube-filled and unfilled polymers. It was also used, in conjunction with a spinning wheel take up system (not pictured), to extrude and extend filled and unfilled polymer fibers.

Figure 17:
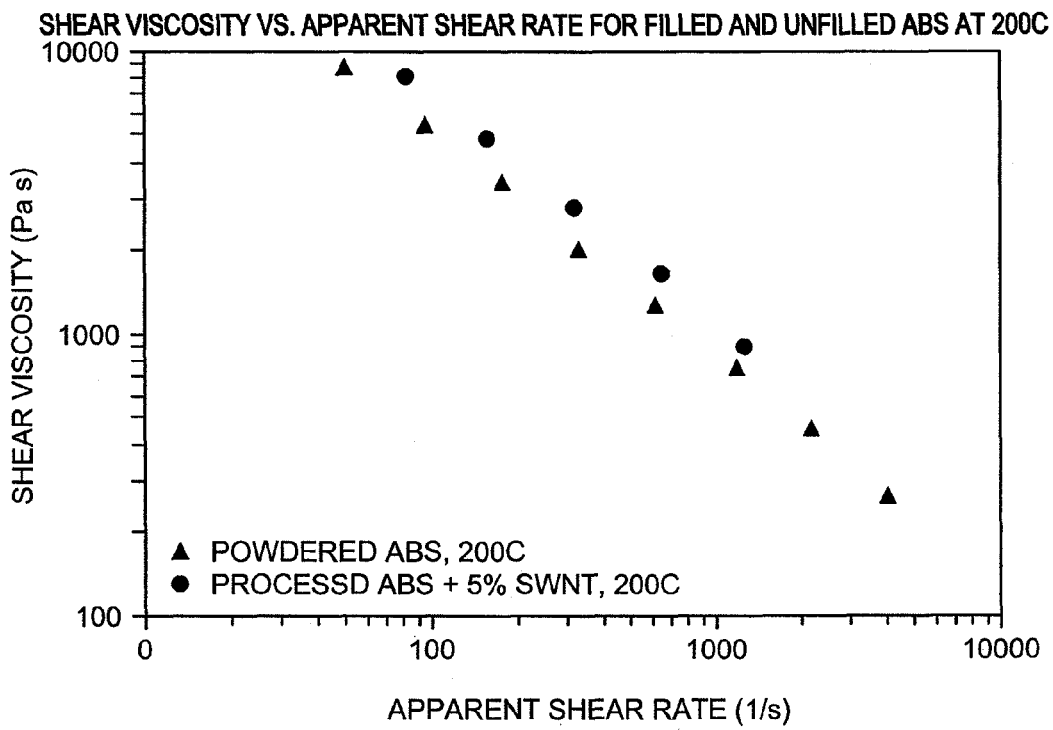
FIGS. 17, 18, and 19 are rheological results for filled and unfilled ABS, polypropylene, and polyethylene, at temperatures and flow rates found to be favorable for fiber spinning with the RH-7.
Figure 18:
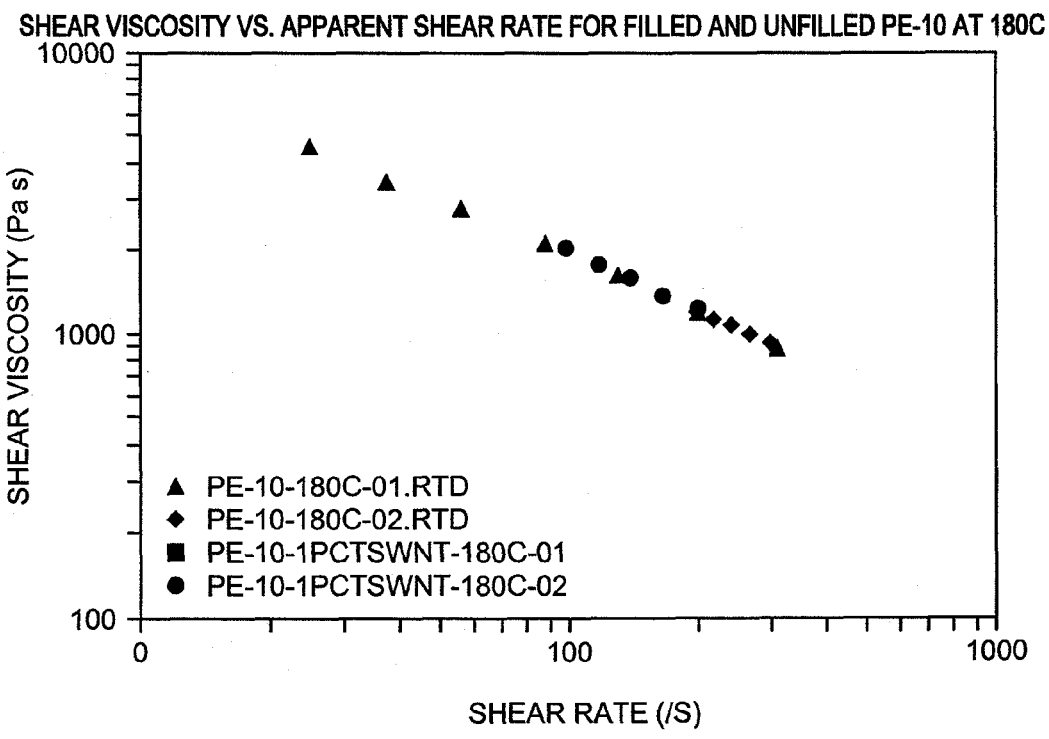
Figure 19:
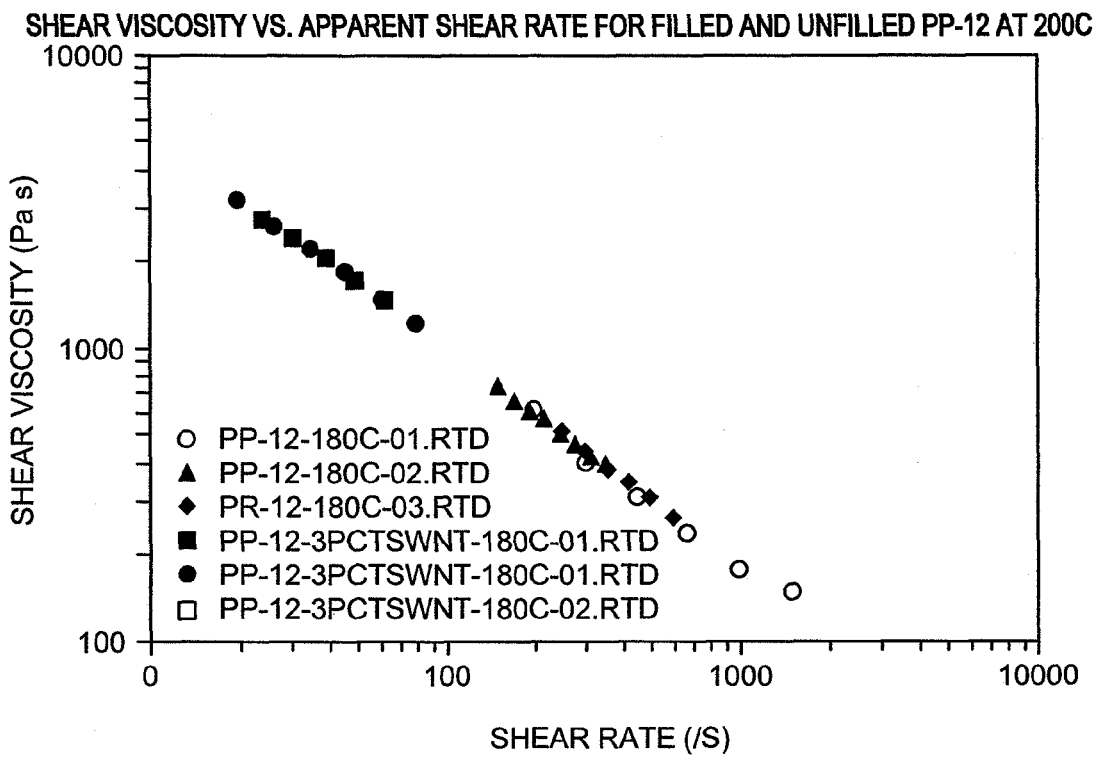

Below in FIGS. 17, 18 and 19 are Rheological results for filled and unfilled ABS, polypropylene, and polyethylene, at temperatures and flow rates found to be favorable for fiber spinning with the RH-7.

Figure 20:
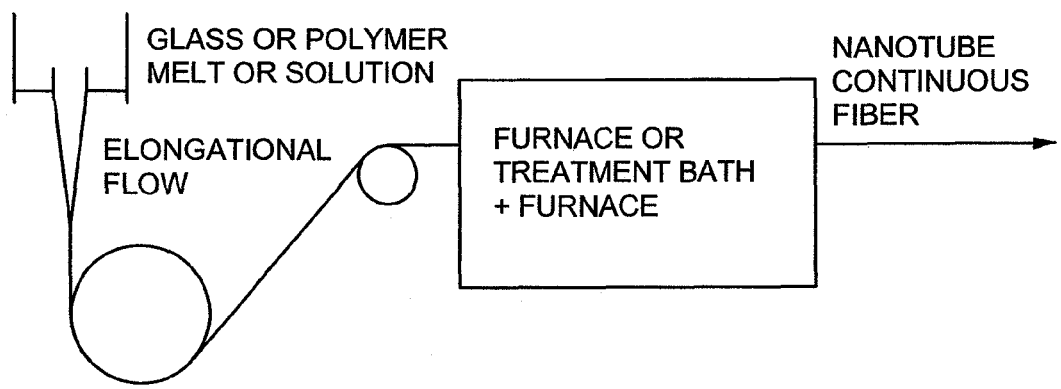
FIG. 20 shows an industrial polymer fiber spinning process.

Industrial melt spinning of polymer fibers is a highly controlled process, with many operating parameters that must be precisely maintained in order to achieve continuous, consistent fibers. The process most often begins with dry polymer chips. These are melted and transported with a screw extruder, which also mixes and homogenizes the melt. The molten polymer is forced at very high pressure through a fine filter, removing impurities, degraded polymer pieces, and gas bubbles. The filter further homogenizes the melt. An accurate metering gear pump is used to force the material through the filter at a precise flow rate. See FIG. 20.

The now uniform, temperature controlled melt is forced at a consistent flow rate through a capillary in a spinneret die. The hole is 100-500 .mu.m diameter, and the polymer is squeezed out as a stream of fluid. The shear in the spinneret partially aligns the polymer molecules, but much of that alignment is lost when as the extrudate swells on exit from the die. The extrudate is quenched and drawn off from the bottom, stretching it thinner and longer. There are many types of quenching methods, but the essential characteristic of all of them is the controlled cooling of the filament as it is drawn. The stretching provides a degree of alignment that depends on the haul-off speed:

Low Orientation—below 1800 m/min
Medium Orientation—1800-2800 m/min
Partial Orientation—2800-3500 m/min
High Orientation—4000-6000 m/min
Full Orientation—not presently obtainable m/min After spinning, the fiber is cold-drawn—a vital step in orienting the polymer molecules. The higher the orientation from spinning, the lower the draw ratio in post drawing will be. An undrawn fiber will be extended by a factor of up to four in length as the molecules that make it up are further aligned.

In any fiber drawing process, process control is of utmost importance. The melt must be consistent, the flow rate through the spinneret must be uniform, and the temperature must be well controlled. In addition, stresses in the melt which cause fracture or rupture must be avoided, as must a drawing tension which exceeds the strength of the filament. The best orientation of molecules in spinning comes when the extensional flow rates are high enough to provide alignment, and the relaxation time of the polymer is long enough so that any aligned molecules do not have a chance to recoil. Thus, alignment is associated with high spin speeds, high molecular weights, and good quenching efficiency. However, low speed spinning and subsequent cold drawing often produces more alignment than just high speed spinning. Low speed spinning and high speed spinning, with additional annealing, hot drawing does even better.

The RH7 was used as the extruder for a low-speed fiber-spinning process. The essential needs of melt spinning were met, albeit with less process control over some areas of the process. The RH7 step motor provides excellent control over flow rates even while delivering well-controlled force to the melt. The dies found most suitable for fiber drawing were of 0.5 mm diameter; the best fibers were drawn through a 8-mm.times.0.5-mm die, held in a "flat exit" die holder to allow the extrudate easy passage out of the barrel without danger of it getting stuck to the walls of a conventional die holder. However, the flat entry of the die is unlike that of a melt-spinning spinneret. The RH7 temperature control is accurate to 0.1.degree. C.

To ensure that flow rates were kept at a level where the required pressure would not cause melt fracture, rheological testing was done not just for viscosity but also for the melt strength. The following figures show the melt fracture and the melt condition for the polymer systems studied.

No quench zone was applied when drawing the fiber other than that of ambient temperature, and the spinning rates themselves were much lower than those seen in industrial processes, about 100-200 m/min.

Figure 21:
FIG. 21 shows a micrograph of PP1000 showing well aligned SWNTs.

Fibers with diameters of 35-50 .mu.m fibers were produced and were reduced to .about.25 .mu.m by stretching. Uniform thickness fibers with well dispersed SWNTs were produced. A number of the fibers had less than homogeneous dispersion due to the use of unpurified SWNTs in many of the cases. Use of the capillary rheometer led to uniform fibers but use of the extruder tended to produce fibers less uniform and in some cases with small enriched thickness sections. It is known in the art that a process assembly using an extruder calls for extruded melt to go into a fluid metering pump so that a constant pressure is maintained on the die or spinneret. The extruder was useful in showing the ability to use an extruder particularly since extruders are more continuous in their processing (manufacturing) than the capillary extruder. FIG. 21 shows a micrograph of PP1000 showing well aligned SWNTs. Alignment was achieved in several fiber systems. The fibers produced using NTT nanotubes also showed alignment but on a limited basis because the SWNTs were only 25% of the starting material.

Figure 22:
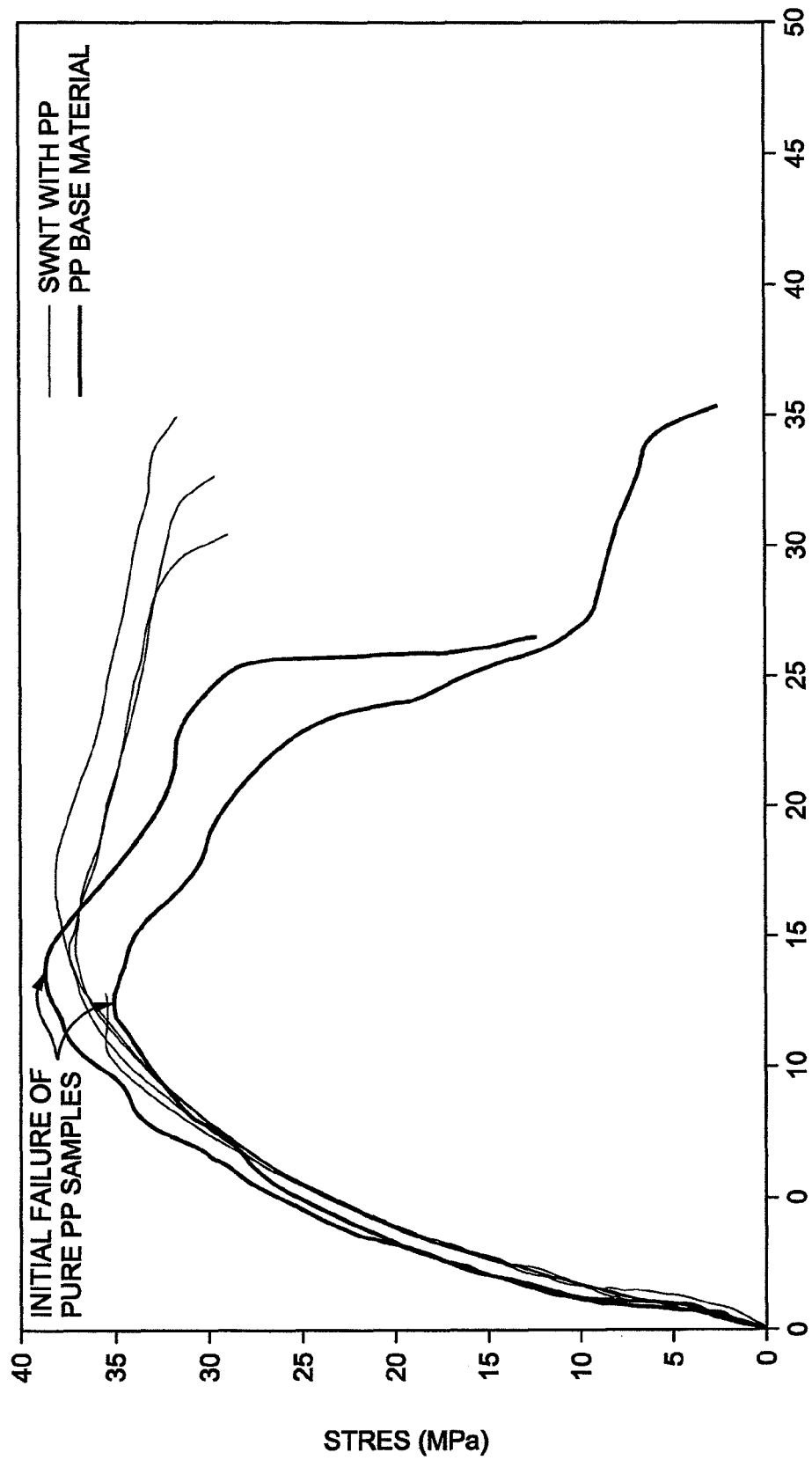
FIG. 22 shows tensile tests on polypropylene samples.

Tensile tests were performed on eight samples of polypropylene samples as shown in FIG. 22. Four of these samples were pure polypropylene and four of these samples were polypropylene containing SWNT. The polypropylene was purchased from Aldrich and the SWNT were provided by Nanotechnologies of Texas. The four samples containing SWNT were die cut from compression molded sheet and possess Type V geometry. The four samples of pure polypropylene were die cut from a thinner compression molded sheet and do not meet Type V geometry specifications with regard to thickness. Of the eight samples, six provide valid data. One of the two samples not analyzed broke as a result of set up error and the other sample fractured outside the gage length. Both of the disregarded samples were pure polypropylene. The test rate used was 0.5 inches per minute, and the strain was calculated over the gage length (0.3 inches) because extensive deformation was not observed. The tensile strength was not improved. The average tensile strengths of both materials were 28 MPa. However, the strain to failure of the PP sample with SWNTs was improved by 115%. The pure polypropylene sample failed in steps as shown by the stress/strain curve. The filled polypropylene samples failed in one step.

Figure 23:
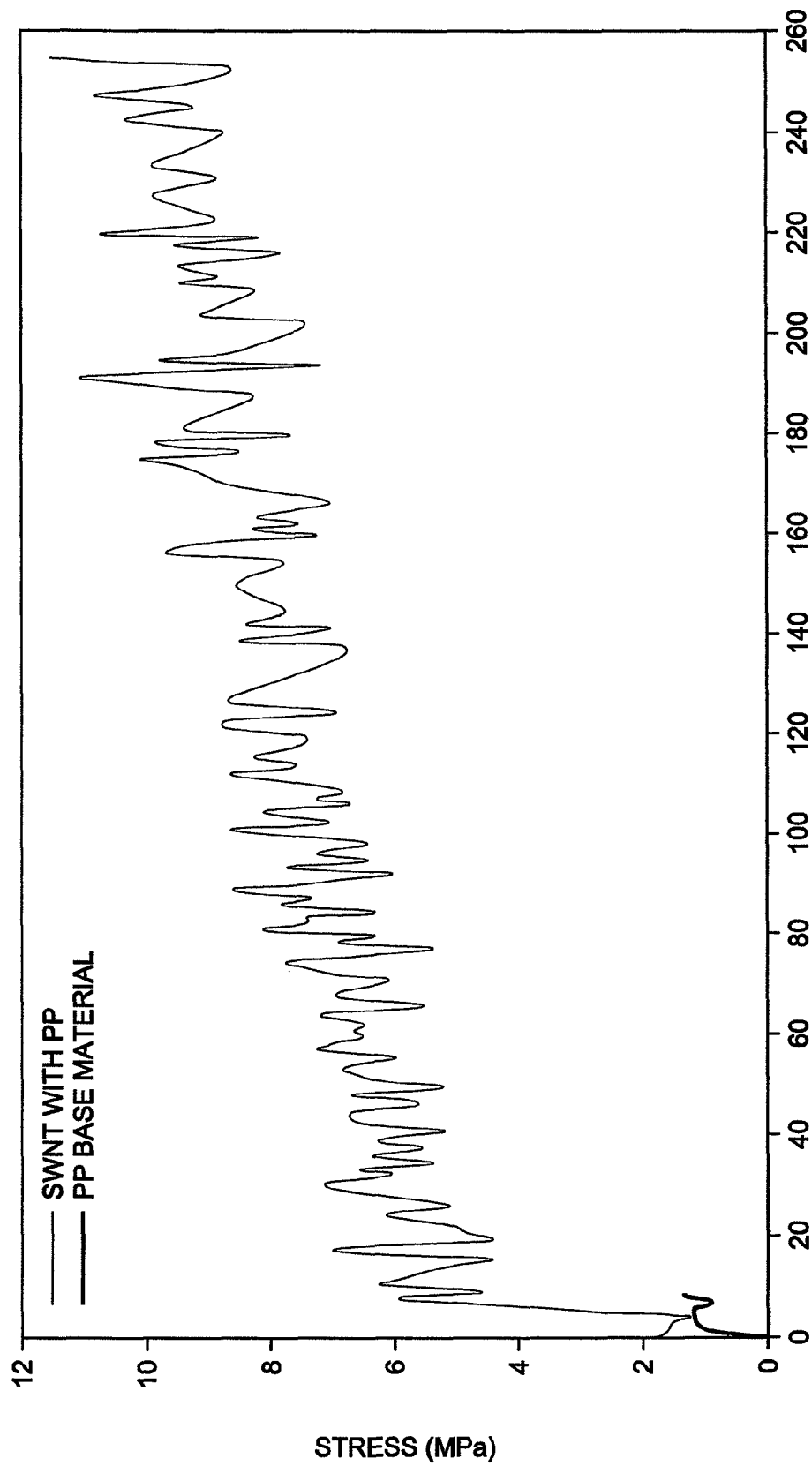
FIG. 23 shows single fiber strength.

The fibers were tested in bundles of 20 fibers. The diameter of the pure polypropylene fibers was 0.0040 inches and the diameter of the filled polypropylene fibers was 0.0015 inches. The test rate used was 30 inches per minute. The strain is calculated over the entire length of the fiber (4 inches). FIG. 23 shows the strength of a single fiber. The graph goes up to the highest load the bundle could withstand. Following this load, individual fibers began to fail. The addition of SWNT increased the tensile strength by 743% and the elongation to failure by 2964%. One important note to consider is that as these fibers get further developed they will surpass the bulk properties of PP even by aligning the polymer system itself. Aligned SWNTs along with aligned polymer may well produce enhanced strength rivaling that expected from single nanotubes themselves. However, the elongation features of this system may be reduced to that of a well aligned polymer system.

Tensile tests in accordance with ASTM D638 were performed on eight samples with Type V geometry. Four samples were made from pure polyethylene, and the remaining four samples were SWNTs in polyethylene. The polymer matrix material was Phillips Marlex polyethylene in pellet form. Nanotechnologies of Texas supplied the SWNT used. The test specimens were cut using a die from compression molded sheet. The test rate used was 0.5 inches per minute. Strain was calculated over the entire length of the sample, 2.5 inches, because extensive plastic deformation was observed in the majority of the samples. The addition of SWNT decreased the tensile strength by 17% and elongation by 37%.

Utility

Figure 24:
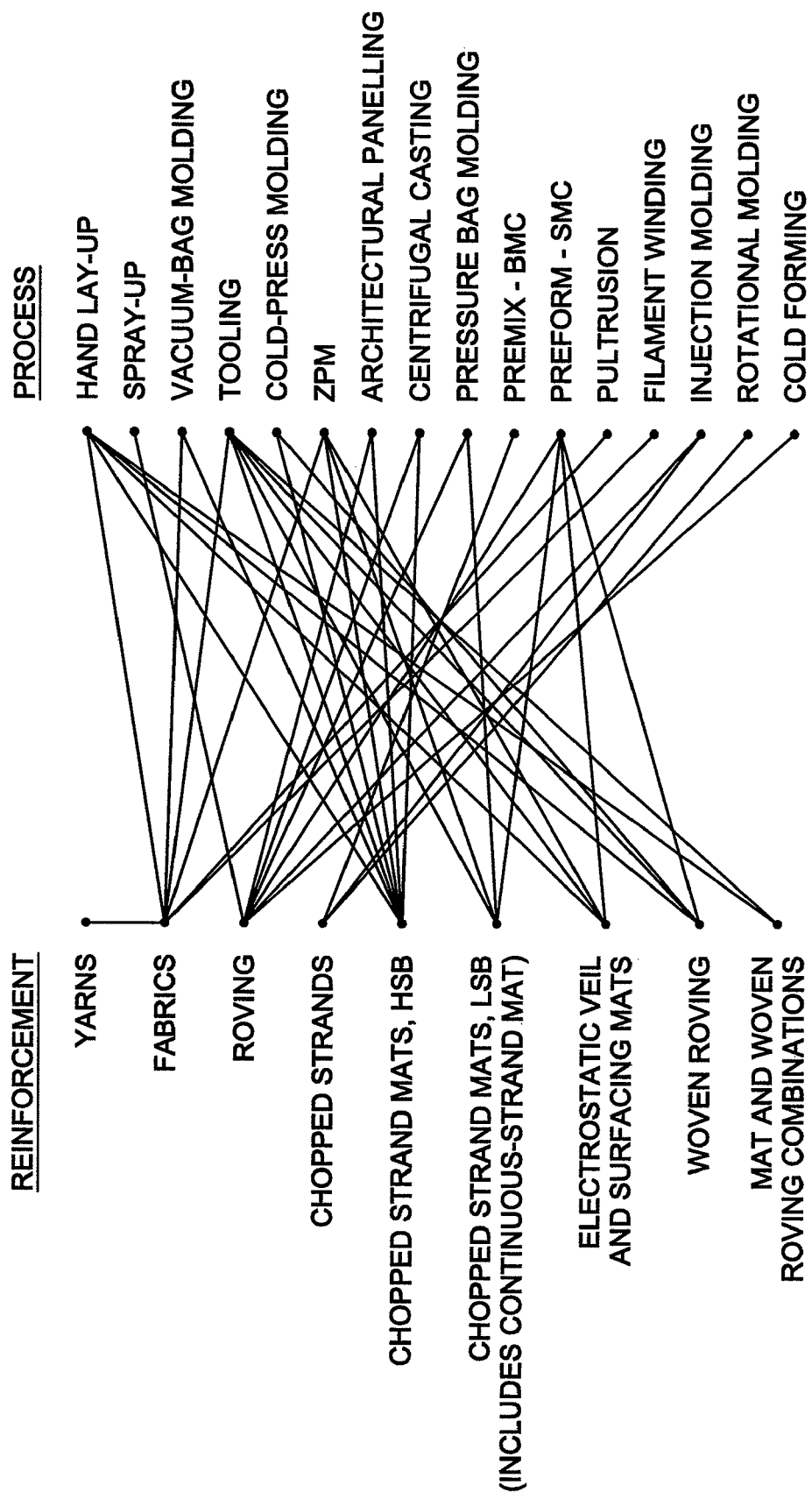
FIG. 24 shows products and processes that can be achieved using NCFs.

The utility of Nanofiber Continuous Fibers is far-reaching. FIG. 24 shows various products and processing that can be achieved using NCFs. These commercial avenues for NCFs impact the highest percentage of the composite manufacturing industry. Beyond this, they impact the textile and fabric industry as well.

EXAMPLE SYSTEMS

Electrostatic Veil and Surfacing Mats

ESD materials are needed for packaging purposes and also for garments, dissipative chairs, work benches, carpets and floor mats for the personnel working in the electronic manufacture site. ESD is a part of everyday life, but in the electronics industry, the cost of damage and rework due to static electricity is estimated to be of billions of dollars annually. Of all the failures in the electronic industry, approximately 40% are ESD related.

As micron-size fibers for structural applications, the NCFs can be woven into crossplies for preforms, vacuum bagging and hand lay-ups. Aligned nanofibers are expected to deliver the most optimum mechanical properties for high performance composites. Assembled cross-ply systems still offer superior performance to isotropic composites since a higher degree of alignment can be more easily controlled for these systems.

Based on accepted models, there is little question that these materials will have significant strategic potential, produce performance enhancement and present immediate industrial benefits (i.e., greater strength/weight ratio). The composite fiber manufacturing technologies currently in place do not have to be significantly altered, although some alterations may occur for specialty fiber systems, so they will be readily accepted from the government and civilian composite communities. These fibers can be used in a wide variety of applications with processes shown in FIG. 24.

The present invention provides a revolutionary approach of processing nanofibers in an isotropic or anisotropic form as a continuous fiber composite providing control over the dispersion and alignment of the nanosize fibers in various polymer matrices. It illuminates a clear path to making aligned nanofibers available to the composite manufacturing community and other industries. It further provides for the opportunity to easily manipulate the nanofibers through additional processing like annealing, reactions, pyrolisys, further modification and functionalization. Polymers can be chosen to enhance or inhibit nanofiber alignment, or selected to be crosslinked or strongly bound to the nanofibers. The polymers themselves may be enhanced and altered by the nanofibers acting as nucleation sites and effecting crystallization and final polymer molecular morphologies. It solves the inherent problem of manipulating nanosize structures while taking advantage of commercial filament and fiber technology.

The present invention provides an enhanced approach to achieve surface resistivities in the desired ESD range for the prevention of static electricity buildup. It provides a novel composition that can be prepared by conventional plastic processing technologies eliminating or ameliorating many of the problems associated with prior art fibers incorporation in plastic matrices and with processing of conductive plastics filled with metal fibers, flakes and powders or chemically modified polymers.

Rheological analyses have shown that the practical possibility of scaling up the composite manufacturing according to the nanofiber weight percentage is at hand.

The present invention shows purified and unpurified SWNTs, and vapor grown carbon nanofiber reinforced thermoplastic composites made into Nanofiber Continuous Fibers. These composites were prepared by mixing the purified and unpurified SWNTs, or vapor grown carbon nanofibers with the thermoplastic matrix in a Haake miniaturized internal mixer (MIM). The mixing process consisted of distributive mixing where the SWNTs or nanofibers were spread over different positions within the chamber and dispersive mixing where the application of high shear conditions and energy were required to overcome the nanofiber agglomerates. Different compositions by weight percent were prepared ranging from 0 to 60% of SWNTs or nanofibers (up to 10 wt. % SWNTs has been used). After mixing, the obtained composite material was then hot pressed to a temperature of 150-200.degree. C. to form thin sheets. These sheets were then pelletized for subsequent extrusion and fiber forming.

Figure 25:
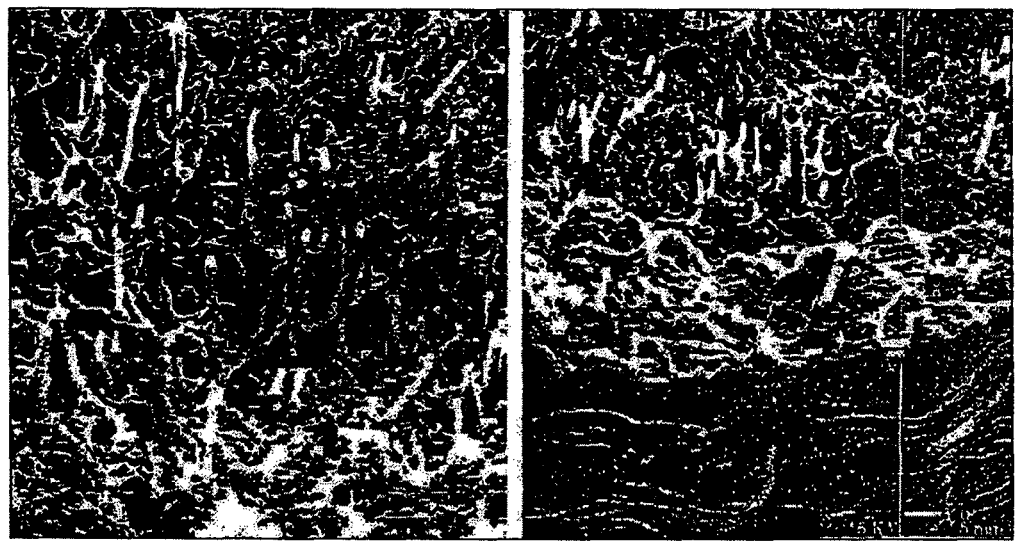
FIG. 25 shows ABS with dispersed and aligned VGCFs (10 wt. %).
Figure 26:
FIG. 26 shows PE with dispersed and aligned VGCFs (a) 5 wt. % and (b) 2 wt. %.

The composites were processed as continuous micron size fibers in which alignment of the nanofibers was obtained, thus promoting then the feasibility to be further processed with conventional composite manufacturing technologies to deliver high performance structures for multiple uses (space, defense and commercial applications). FIGS. 25-26 show NCFs with aligned nanofibers or SWNTs. Surface conditions of the NCFs can be varied as can degree of alignment and deagglomeration. FIGS. 27 and 28 depict these various conditions.

Since the nanofibers are black materials, the possibility of having transparent composite materials for specific applications becomes an issue. The composite can be thinned to be translucent so some visibility can be obtained (not that this applies to sheet forms).

Having prepared the composites as micron size fibers it provides the feasibility to be used for structural applications, thermal and electrical applications. Highly anisotropic thermal systems are of significant interest.

Example

Application of Nanotube Reinforced Polymers for Fused Deposition Modeling

The alignment that occurs with nanotube continuous fiber processing can be achieved by Fused Deposition Modeling (FDM) processing. A spool of nanofiber reinforced polymer is formed into wire feedstock for the FDM process, a rapid prototyping (RP) process, also sometimes identified as a free form fabrication technique, is processed into final parts using computer generation of slices of a three dimensional (3D) image for layer by layer manufacturing. The alignment is due to shear processing by extrusion and some extensional flow while spooling (to achieve the desired diameter) and enhanced in the hot extrusion aspect of the FDM process. In this process, the nanofiber composite wire (.about.2 mm in diameter) is extruded through millimeter-size dies to generate rows that build sheets and 3D parts. FDM feedstock can be made by producing wire by extrusion or by grouping NCFs with further processing to make wire.

Another application related to FDM is to make the spools of materials (having reinforcing nanotubes which add to, in some cases, electrical and thermal properties) to manufacture small batches of plastic parts for commercial purposes and a range of applications, with FDM, parts with intricate internal shapes can be manufactured which in the case of other traditional technologies is either not possible, or it will be too costly since, in order to compensate the price, a few thousand parts have to be made. Examples of these parts include medical tools, electronic, replacement parts, etc. An example of space applications of FDM parts made with the material is the use of FDM on the Space Station where the superior feedstock (nanotube filled polymers) is used to make replacement parts, rather than storing supplies of parts in the limited space on the Space Station.

Vapor grown carbon fibers (VGCFs), mixed with various polymers are proving to be a good approach to producing polymeric composites using nanotubes. VGCFs can be mixed through shear processing without nanofiber breakage and high degrees of dispersion can be achieved originating from a tangled mass. Similarly, functionalized nanotubes can be more fully integrated into polymeric systems. In the present invention, the processing "Bandury" mixing was used to produce feedstock continuous filament for Fused Deposition Modeling (FDM), enabling composite part manufacturing for a range of applications and well past material property evaluation. Nanofiber composites significantly enhance rapid prototyping techniques like FDM, SLS, etc. because of their potential for enhancing polymeric properties as a multifunctional material (structural/electrical, structural/thermal, structural/impact).

FDM is a manufacturing process that takes a feedstock (continuous filament or billet) and hot extrudes it to make continuous traces of polymer material. The traces map out a layer and subsequent layers can be deposited on top to build up 3-dimensional shapes. Any number of sample forms can be produced as long as a 3-D computer image can be generated. That file is then cut into slices to match the process parameters for the FDM. The FDM unit then builds the part (bottom up technology") layer by layer starting from a removable support. FDM parts are generally used for models, molds and for some part applications where material usage is optimized (waste is minimized) and tooling and part finishing is reduced. A number of feedstock materials are available and include wax-filled plastic adhesives, nylon copolymers, investment casting waxes and acrylonitrile-butadiene-styrene (ABS). ABS is the more optimal for part applications because of its superior strength to the other materials available. Composite feedstocks filled with various reinforcements, including chopped carbon fibers, are now being developed with the purpose of enhancing mechanical strength of FDM parts. Typically, filled polymers are of interest because they have the potential of improving interlayer strength, many times the weak link in FDM parts, and to enhance stiffness which is often seen in filled polymers. The availability of high strength polymers for FDM extends its use in part manufacturing and extends its application range.

In the present invention, three feedstocks were produced using (1) purified VGCFs, (2) pelletized VGCFs, and (3) as-received SWNTs. Pelletized, in this case, is a processing method to improve handling where a latex sizing is placed on the nanofibers from the commercial producer. The as-received SWNTs provided illustrative processing of SWNTs with ABS using high shear and FDM processing. A number of different parts were produced including three different tensile tests part sizes. Parts were also made connecting plain ABS to the VGCF composite to show that the new materials can work in conjunction with the currently available ABS. The processability of FDM parts using nanofiber/polymer composites was evaluated, tensile tests were conducted and the fractured regions of the samples were analyzed using electron microscopy. XRD was used to verify the presence of aligned nanofibers in the wire feedstock and FDM parts. The enhancements observed for the nanofiber filled polymers demonstrate that these composite materials can enhance the use of rapid prototyping, such as FDM.

In the FDM process the wire is fed between two friction bearing rollers that account for velocity control. This process is conducted in a temperature control chamber that terminates in a circular die. The temperature is maintained just above the solidification point. When the material exits the die it solidifies as it is directed into place with the X-Y controlled extruding nozzle. FDM consists of the deposition of continuous layers next to and on top of each other to build the specified model under CAD control. The successive layers are bonded by thermal fusion. The heat capacity of the material is important to the amount of shrinkage and the degree that the material fuses to itself.

FDM work was conducted involving filled feedstocks for producing ceramic filled polymers for prepreg applications. The filled polymers are used to trace out a mold that is subsequently sintered to form a ceramic part. The polymer is burned out, leaving behind a porous ceramic pre-form which can be infiltrated with metals of other matrix materials.

VGCFs known as Pyrograph III with an average diameter of 100 nm were obtained from Applied Science, Inc. in as-received and pelletized forms. The as-received VGCFs were purified and functionalized before the compounding stage according to previously developed procedures. The ABS GMID #31875 was obtained from Magnum. ABS was chosen because of its high strength and use in FDM. Typical properties for ABS are listed in Table I along with those for the VGCFs.

Composite preparation was conducted using a HAAKE torque rheometer using a 30 g mixing bowl. ABS was compounded with the various nanofibers at high shear rates to achieve a homogeneous dispersion. Dispersion, in this case, means homogeneous spread of the fibers and individually isolated fiber forms (either individual VGCFs or individual ropes). Starting sample compositions of 10 wt. % were prepared. Samples were hot compression molded and pelletized (chopped up into small pellets) to use as a feed material for the wire extrusion. Composite batches were then extruded at a rate of 5 rpm and spooled on to a reel-type container while maintaining a constant cross-section for the length of the wire extruded.

The extruded samples of plain ABS, with VGCFs and with SWNTs had a diameter of 1.7.+-.0.1 mm which was optimum for the FDM processes. Extrusion to form the wire for all composites was conducted by starting the extrusion with plain ABS pellets, followed by the composite material, and finished off with plain ABS again to sufficiently fill the extruder barrel. This approach caused the composite of the wire feedstock to vary over the length of the wire so that the maximum composition achieved was 10 wt. % at the middle of the extrusion run.

A Stratasys Inc. FDM 1600 that operates using spooled feedstock material and at relatively low shear rates was used to manufacture several parts. Parts were made in dome shapes, spacecraft models, logos, and tensile tests samples of different sizes. Straight bar and dog-bones tensile samples were fabricated for the various strength measurements. The samples consisted of 12, 9, or 10 deposited layers in (I) flat bar, (II) cross section #1 dog bone or (III) cross section #2 dog bone. The insert shows the schematic of the FDM process showing the extruder tip drawing out polymeric traces being built into layers. The arrows indicate the ability of the extruder to traverse the surface. FDM traces were, in all cases, cross-plied with either 90.degree./180.degree. or 45.degree./45.degree. orientations. Mechanical tests were conducted using a MTS hydraulic tester. The tests were carried out at a strain rate of 2.54 cm/min at room temperature. Care was taken in the placement and orientation of the samples to better understand alignment of the sample effects and those that might be associated with the orientation of the FDM growth process (top and bottom orientations).

Cross sections of composite filaments and tensile fracture surfaces were analyzed with a JEOL scanning electron microscope. The samples were gold coated even though 10 wt. % VGCFs leads to electrostatic dissipative conduction in these materials. The wire fracture surfaces were taken from samples submerged in liquid nitrogen to promote a highly brittle fracture and to reduce induced alignment during fracture. Nanofiber alignment was studied by observation of fracture surfaces. Generally samples are fractured at liquid nitrogen temperatures to prevent alignment from occurring during the fracture process and distorting the results. Significant care must be taken to ensure alignment from deformation does not occur.

Figure 29:
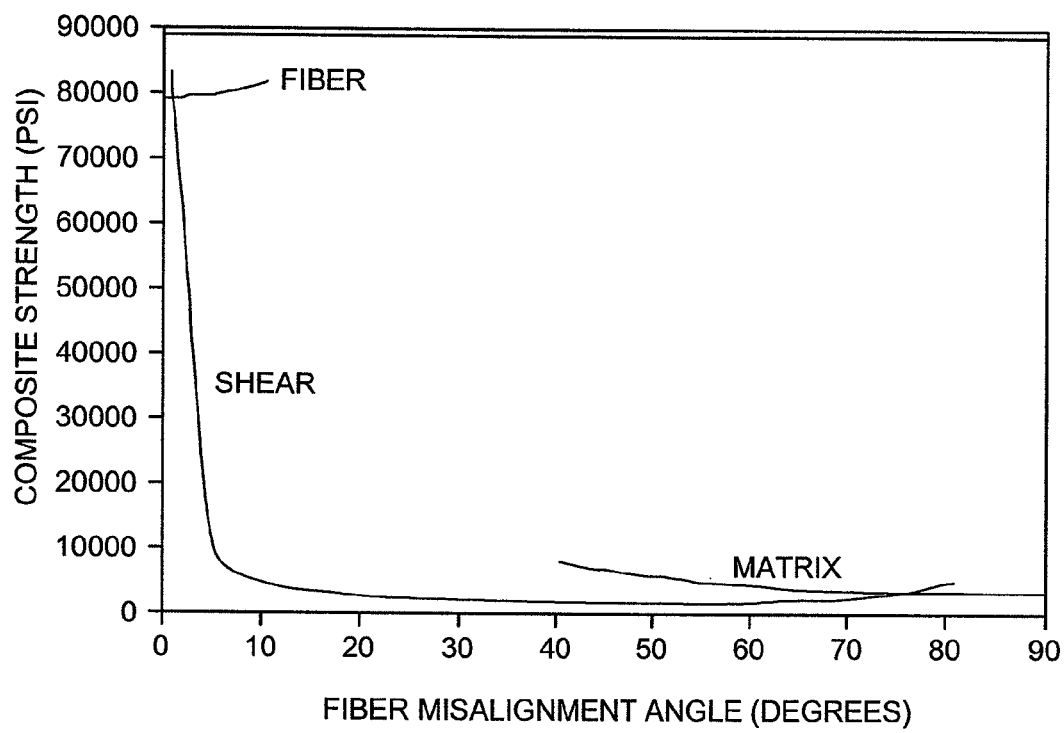
FIG. 29 shows tensile test results following correction for the cross-plying
Figure 30:
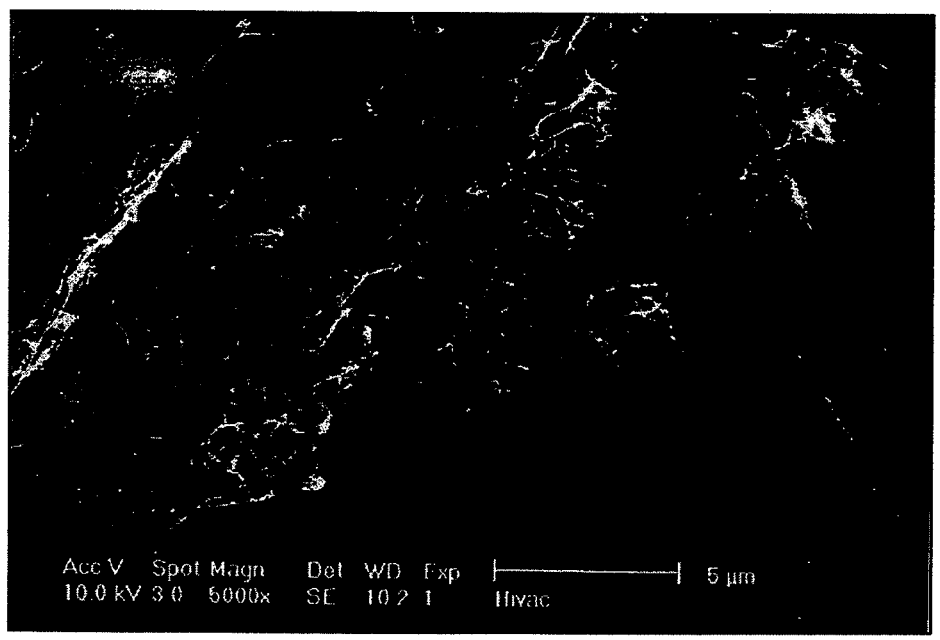
FIG. 30 shows a micrograph of the polymer with as-received not dispersed SWNT.

The nanofiber/ABS composites have showed improvements in tensile properties over the unfilled ABS processed at the same conditions. Composites tested were from the pelletized VGCFs. These samples were processed with 90.degree./180.degree. cross-ply conditions. The data for the ABS is relatively consistent, as would be expected from a FDM process. The tensile test results for the VGCF/ABS data showed significant scatter related to concentration changes and the lower amount of swelling that occurs in the filled ABS. Scatter in the data is also thought to be related to the variation in the feedstock diameter which would also occur in the traces as the samples are processed. Feedstock wire (filament) was hand-spooled on the spools to be used in FDM and this would lead to variations in the tensile test properties. Measured tensile strengths tended to be 50% less than published ABS data which is listed in Table 1. FIG. 29 shows tensile test results following correction for the cross-plying where only half of the sample is effectively tested due to 90.degree./180.degree. cross-plies. Note again the consistency in the ABS data and the variation in the VGCF/ABS results. This difference is a 65% increase over the unfilled ABS, a significant increase even though there was limited wetting. Table 2 shows the results for the SWNT/ABS material. FIG. 30 shows a micrograph of the polymer composite microstructure where the as-received SWNTs are not well dispersed. Non-nanotube material (amorphous carbon and metal catalyst) hinder the shear mixing of the nanotubes. The improvement in strength is important yet not critical since the mixing was not homogeneous.

Various samples tested showed moduli up to a 150% increase in stiffness. The SWNT/ABS samples saw a 100% increase in stiffness. A decrease in ductility for the reinforced ABS is observed where nanofiber reinforced samples had a brittle fracture with limited signs of ductility, where SEM examinations revealed that crack propagation had localized yielding restricted basically to the filament layers oriented parallel to the applied stress. This localized yielding has the form of craze formation.

Figure 31:
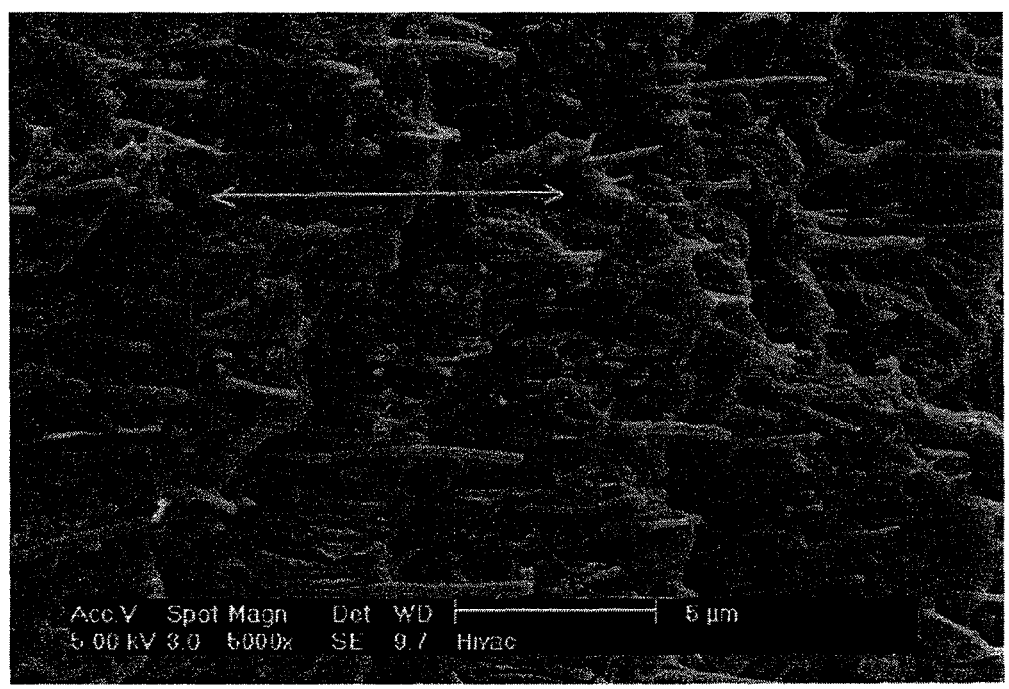
FIG. 31 shows longitudinal cross section of the wire feedstock.

The VGCF/ABS feedstock was analyzed by SEM after the extrusion process. FIG. 31 shows the longitudinal cross-section of the wire feedstock. The arrow indicates the axial direction of the wire. The extrusion high shear condition and the extensional flow during wire spooling caused alignment of the nanofibers. Shown are a high degree of aligned VGCFs which are well dispersed and not bunched up with each other. Since the fibers appear very clean and the polymer is not highly deformed around the fibers, wetting is described as poor with a low level of resistance occurring with fiber pull-out. The fibers have similar lengths to the starting conditions and are undamaged from the high shear that occurs in the mixing and extrusion processes. XRD was used to further evaluate the VGCF alignment and Table 3 shows the results for several samples of the feedstock evaluated. The existence of the preferential fiber orientation definitively contributed to strength enhancement since isotropic samples showed no strength variations in a previous study.

Figure 32:
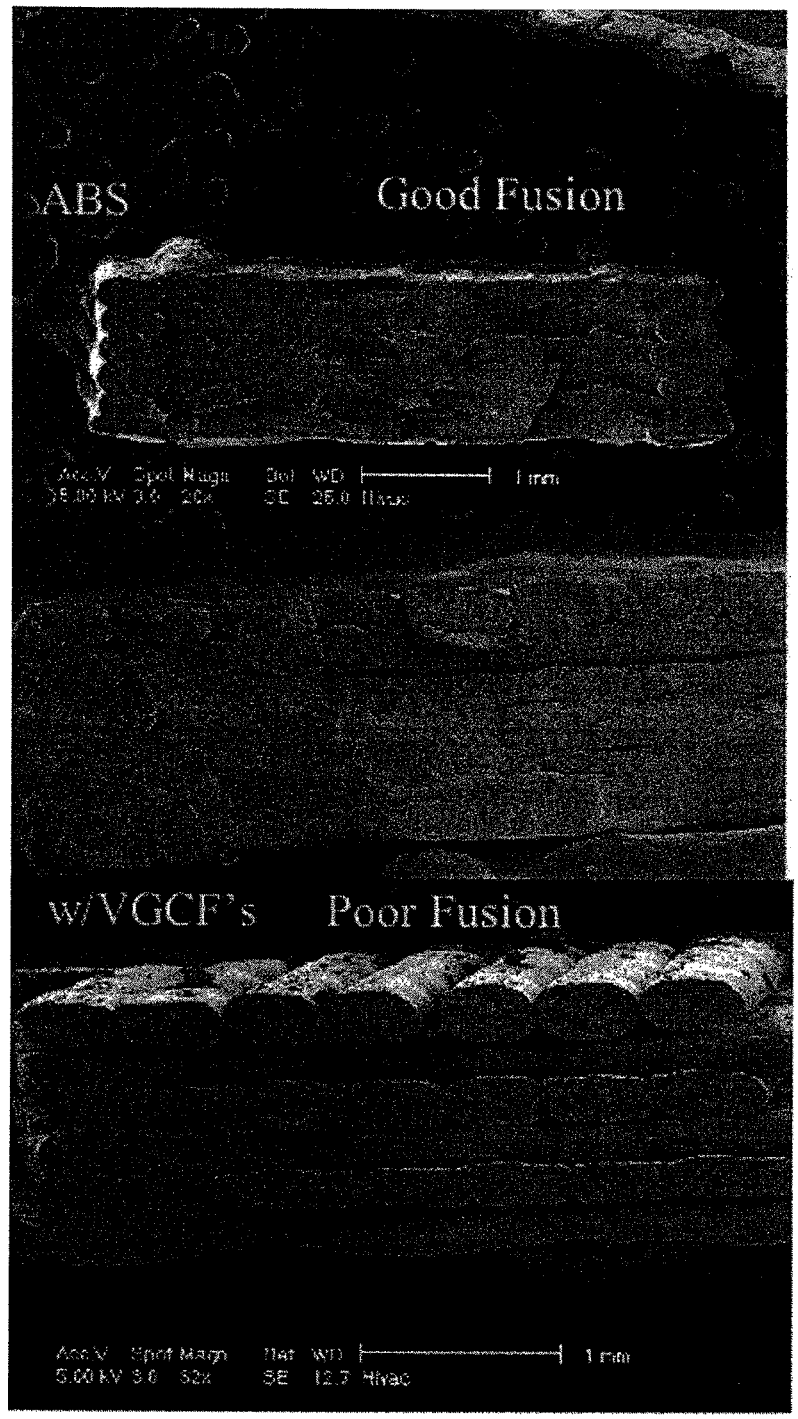
FIG. 32 shows inter trace fusion.

The ABS samples consistently showed good inter-trace fusion as seen in FIG. 32 although it was not ideal. The VGCF/ABS samples showed a variation in fusion conditions which tended to match the tensile results and the scatter observed. Shown in FIG. 32 are samples with six layers, (which were cross-plied 90.degree./180.degree.). Note that interlayer strength is still low for the VGCF/ABS, in part because the FDM is not optimized in its process parameters for the lower swelling of the feedstock material (associated with different thermal properties of the filled material). Limited porosity is also observed in some cases in the VGCF/ABS traces which is attributed to the extrusion process and not to the initial Banbury mixing.

Figure 33:
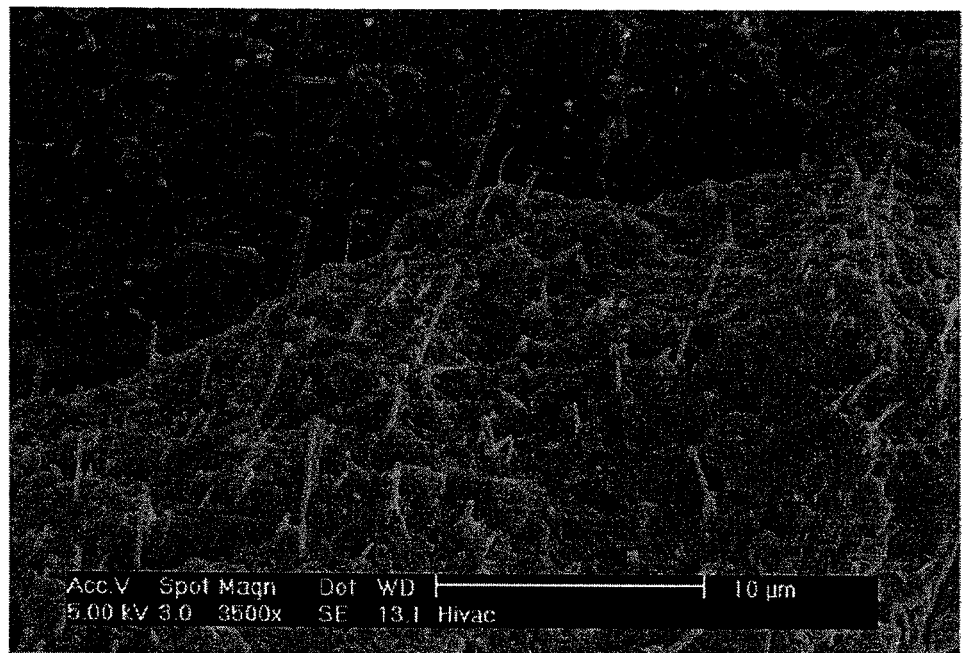
FIG. 33 shows inter trace fusion in cross ply.
Figure 34:
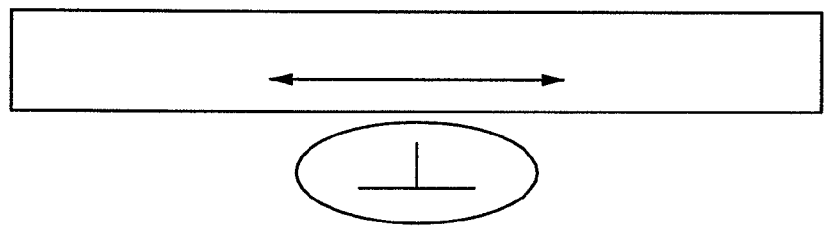
FIG. 34 shows the two conditions of FIG. 33.

Optimization of the extrusion process where more composite material is used, eliminating the use of plain ABS, is expected to eliminate this defect condition. The poor fusion sample in FIG. 32 and FIG. 33 shows the directions of traces from 90.degree./180.degree angles. The traces during FDM processing also resulted in conditions of aligned VGCFs. FIG. 34 shows the two conditions depicted in FIG. 33. Micrograph (a) shows a trace produced with the axial direction of the trace shown as the area indicates. Figure (b) shows a condition where the trace is effectively pointed out of the page so that the axial direction of the trace is coming out of the page. Note again the alignment conditions, the dispersion and the absence of clustering of the VGCFs. Note also the poor wetting observed as either open space (troughs) around the VGCFs or left on the polymer surface where VGCFs once were (micrograph a) or as VGCFs easily pulled away from the matrix showing gaps between the VGCF and the polymer matrix (micrograph b). Note also that some nanofiber breakage likely occurred for those aligned with the tensile test condition (the tensile axis was aligned with the micrograph (b) condition) since the VGCFs in micrograph (a) are much longer then many of those seen in micrograph (b). In the case of the transversely oriented layers it can be observed that failure occurs mostly by matrix failure. The micron size circular particles are expected to be the segregated butadiene phase of the ABS. These features were also observed in plain ABS. The figures further show the degree of alignment with the direction of the traces. The holes seen on the sample surfaces are produced from VGCF pull-out and not from process porosity. Process porosity tended to show surface morphological differences in the polymer and was only observed on a few of the early processed samples.

The conferred effect of the nanofibers on the fracture behavior of ABS is similar to the fracture behavior of tightly cross-linked resins where the molecular network is unable to deform sufficiently. In this case the nanofibers decreased the resistance to yield acting as constraints for chain mobility. The decrease in chain mobility increased the stiffness of the material which was first observed by the differences in swelling on the extrusion process. The toughness of the composite is therefore lower than that of the pure ABS but the strength and rigidity are improved.

Along with this application in the use of FDM, the material of the present invention has the potential to provide multifunctional properties. This is to say that, while the material is structural, it may also be a thermal management system and or an electrostatic discharge material (or electromagnetic interference material). This new material, initially described as NCFs, would be a new multifunctional material system that could be manufactured into a range of parts for mechanical, electrical, thermal, or combined applications. Examples of NCFs are mechanical/electrical, mechanical/thermal, electrical/mechanical, impact/strength, and impact/electrical or thermal. NCF can be made with a ceramic matrix, and there are FDM-like systems (a robocaster) for making parts with a ceramic matrix.

The FDM can further be used to make nanofiber continuous fibers. By starting with the nanofiber composite feedstock (wire or filament) the FDM can be used to extrude out fiber where high shear and elongational flow are implemented. In the die the shearing action takes place and subsequent elongational flow can be achieved as the material leaves the die. Continuous fibers with 10 wt. % VGCFs and 10 wt. % as-received SWNTs have been processed from a FDM.

Example

Application of Fully Integrated Nanotube Composites for Multifunctional Applications Fully integrated nanotube composites (FINCs) are implemented as plastic lightweight wires and interconnects. The goal of this research is to mimic on a larger scale the properties of nanotubes so that their properties can be used more aggressively on micro and macro scales. The idea of mimicking nanotubes involves two concepts. The first is the single wall nanotube (SWNT) integration by tip attachment (and/or side wall functionalization), coincident polymerization, and high shear alignment. This path will provide for hybrid materials that will be designed to expand out the properties of the single nanotubes by translating their properties to each other. This is to say, material that might be considered the matrix must be nanotube like as well. In this system, nanotube to polymer connections are designed to foster enhanced mechanical properties. The first step in this path is through mimicking a polymer (polymer processing) followed by designing an architecture for mimicking nanotubes. The second concept leading to the goal of mimicking nanotubes involves identifying the properties of nanotubes in other systems where those properties can be fostered for materials enhancement. The starting system is a nanosize graphitic material similar to SWNTs in that it must be separated from itself before subsequent processing. Consider that small flakes of graphite can be separated on the individual flake basis where no defects occur in the flake (much like for nanotubes). The flakes would be bonded through available bonds on the outside of the flakes in a similar way that we would functionalize the tips or the outside wall of the nanotubes. In short, nanometer size carbon sheets rather than tubes are identified which mimic nanotubes in a number of ways. A number of bonding conditions for the nanotube-like materials translate back to nanotube advanced materials developments.

The present disclosure describes the methods to produce a highly conductive polymeric wire and interconnect system with good stability of the conduction properties and permeable plastics to alter conduction by gas interaction.

Materials produced demonstrated significant reductions in resistivity with only 10 wt. % SWNTs added to a thermoplastic polymer system. The key was to gain homogeneous dispersion so that conduction could occur with an opportunity for structural enhancement as well. Segregated dispersion of nanotubes would lead to a low percolation threshold but with little to no structural enhancement.

Methods of the present invention provide highly conducting polymers resembling metallic-like conduction properties such as that for polyacetylene (PA) but more stable or with higher environmental stability. Processing from a polymer basis of nylon, poly(methyl methacrylate) (PMMA), and conducting epoxy develops a polymer architecture for mimicking nanotubes. Conducting epoxy is a polymer that can be processed with insulating, semiconducting or conducting properties. Processing further will enhance its stability, its conducting properties and provide a high temperature polymer system. These materials can be used for wire and other interconnects. Extending their properties for multifunctional use also enhance the thermal and structural properties of these material. Gas permeable polymers are considered to alter the electrical conduction by gas exposure.

The derivatization or functionalization of SWNTs opens the way to new approaches in making advanced hybrid materials that are a cross between polymers and composites. The traditional composite mixing with carbon fibers is limited in the amount of interaction and bonding of the nanotubes with the polymer matrix. Sidewall and tip functionalization provide attachment of different organic groups to modify and control the bonding and interactions with the polymer. The purified nanotube materials as currently available, consist of tangled bundles of SWNTs ropes. Mixing such material with polymers gives physical linking with the random polymer coils and the random nanotube tangles becoming intermingled during mixing. This limits the dispersability of the nanotubes, and the homogeneity of the resulting composites. Cutting the SWNTs in oxidizing environments not only gives shorter tube segments, which are more easily dispersible, but opens the nanotube tips, allowing for chemical modifications to be made. Sidewall fluorination of the SWNTs also breaks the ropes so that individual tubes are soluble in alcohol, and opens the door to the attachment of organic molecules to the tube wall.

Figure 35:
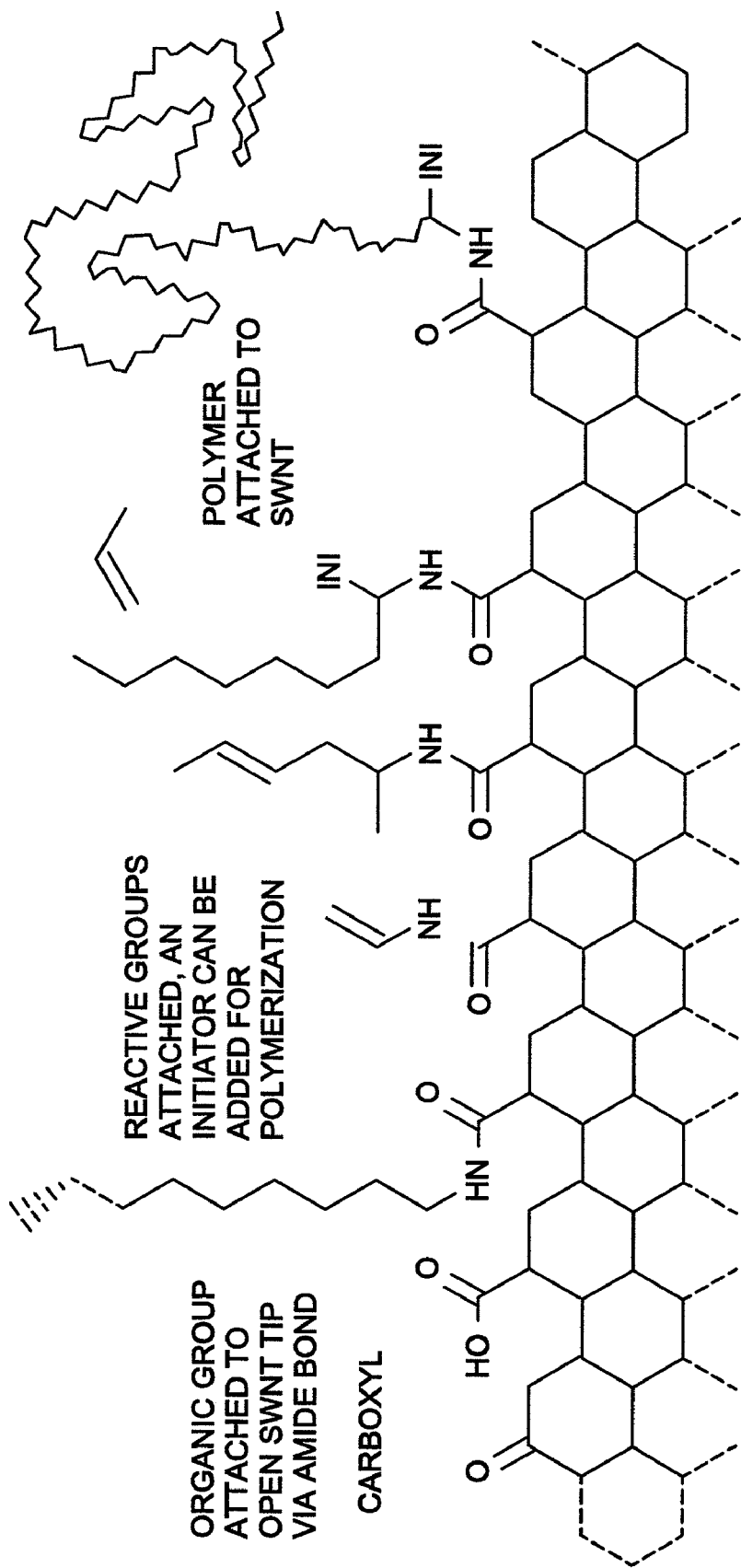
FIG. 35 on the right shows attachment of polymer chains to the oxidized edge of a cut SWNT via amide linkages.
Figure 36:
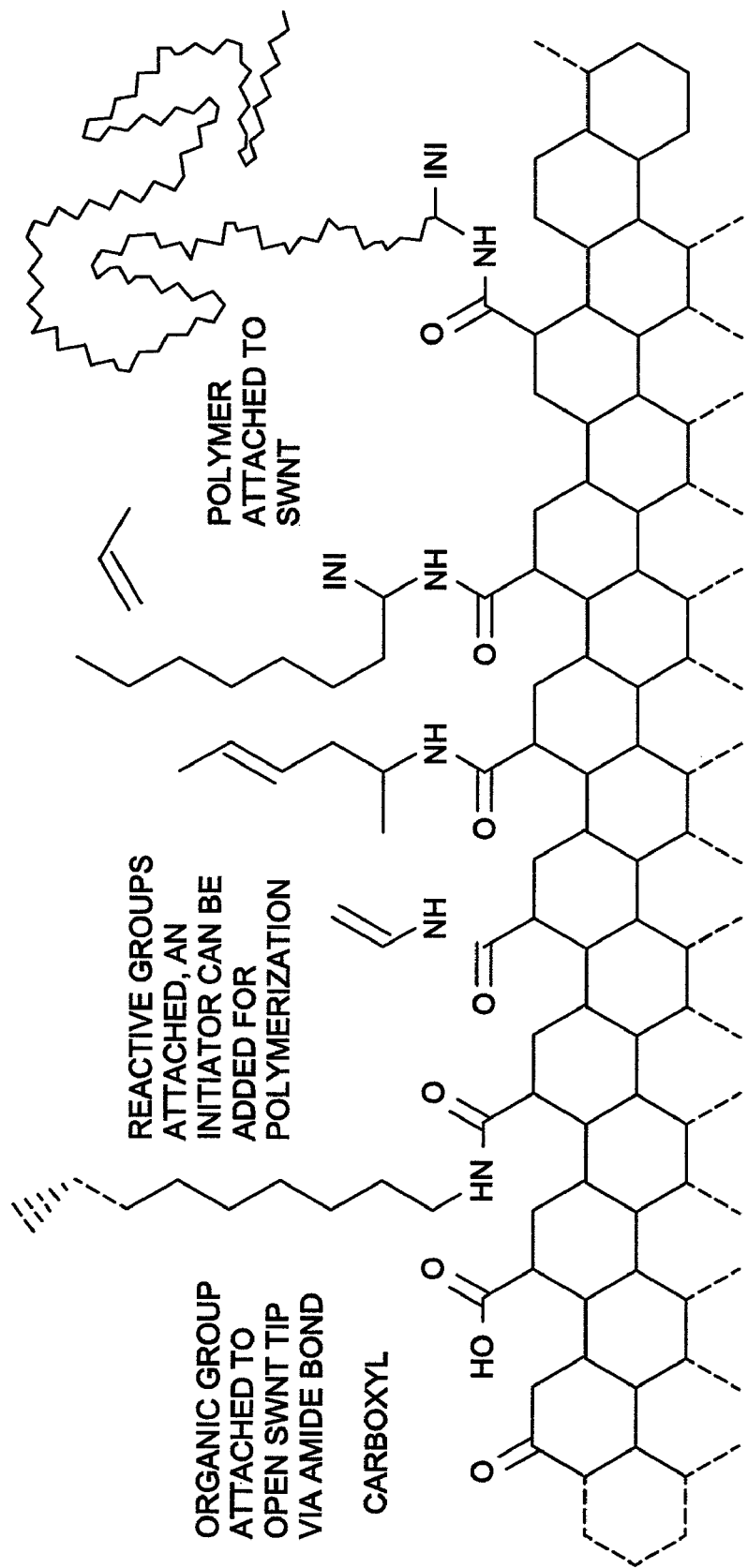
FIG. 36 on the left shows attached organic molecules.

SWNTs can be derivatized on the open edges, which become decorated with oxygen groups (hydroxyl, ketone, carboxylic acids) by sonication treatment in acid. The carboxylic acid group can react with amines to form amide bonds, which allows the attachment of compatibilizing groups to increase the interactions with the polymer matrix. Aliphatic and aromatic chains of different lengths can be attached and these organic chains can also have polar groups such as ester, ether, amides, or terminal amino groups, which can be used to create hydrogen bonding interactions with suitable polymer matrices. Organic chemistry can be used to modify the functional groups in the attached molecules, allowing for complete control of the interactions with the polymer. The left side of FIG. 35 shows the attachment of polymer chains to the oxidized edge of a cut SWNT via amide linkages. The left part shows the attachment of an organic molecule that can act as compatibilizer for a polymer matrix. The center of the figure shows how the attachment of a reactive molecule (in this case a double bond) can be used as the starting point of a polymer chain. The polymer chain will be directly attached to the SWNT tip, as shown in the right part of the figure.

Figure 37:
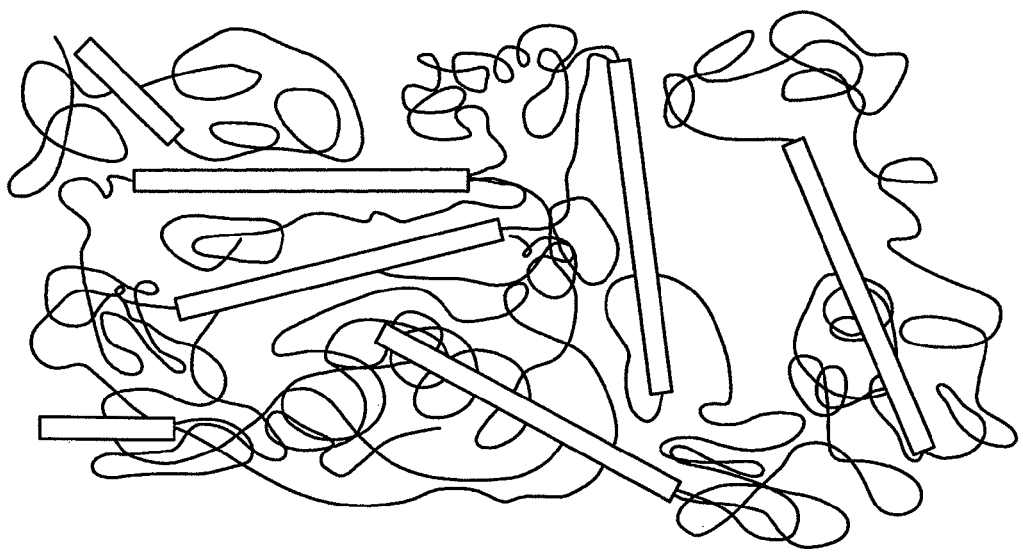
FIG. 37 shows nanotubes crosslinking polymer chains.

The attached organic molecules can also serve as a starting point for polymerization, and an example is shown in FIG. 35 where attaching a molecule with a double bond can be used for the radical polymerization of polyethylene. The polymer chains formed will be directly attached to the open nanotube tip. During polymerization, two growing polymer chains may join, creating random length polymer links between SWNTs. It is also likely that more than one polymer chain will start from an open nanotube tip. This is expected to result in the nanotube acting as a crosslinking agent between polymer chains, as exemplified in FIG. 37, a representation of crosslinking that may result from random polymerization starting at SWNT tips.

Figure 38:
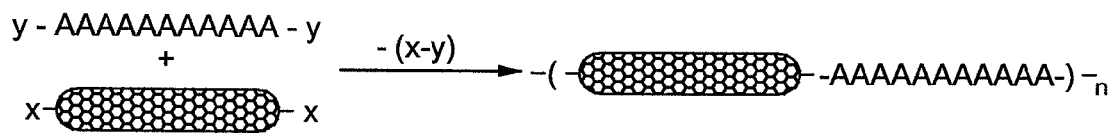
FIG. 38 shows nanotube block copolymers.

Producing different linkages to nanotubes would be like producing different blocks for block copolymers. In FIG. 38, a representation of nanotube block co-polymers, envisions activating the nanotube tips by adding a functional group (x), that will react with functional groups (y) at the ends of polymer block of a monomer A. The resulting polymer would be a "nanotube block copolymer", where the nanotube is an integral part of the composite, and chemically bonded to the polymer matrix. These reactions can proceed in a manner analogous to the attachment of simple organic molecules using amide linkages.

Figure 39:
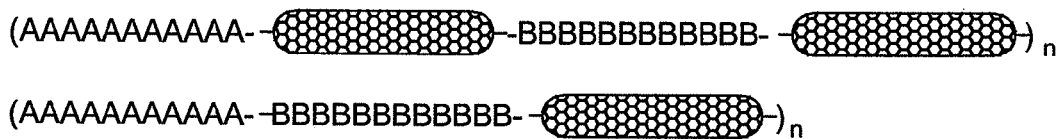
FIG. 39 shows possible configurations for alternating polymer blocks.

The polymer blocks can be selected to have different properties, chemical backbones, reactivity, lengths and length distributions. Varying the nature and length of the polymer chains between the nanotubes will allow us to selectively vary properties of the composite. It is also possible to have a different polymer block (B) to have further modifications and control of the properties of the nanotube block copolymer. Different alternations of the blocks (polymer A, polymer B, nanotube) are possible, as shown in FIG. 39, two different possible configurations for nanotube block co-polymers, with alternating polymer blocks.

Figure 40:
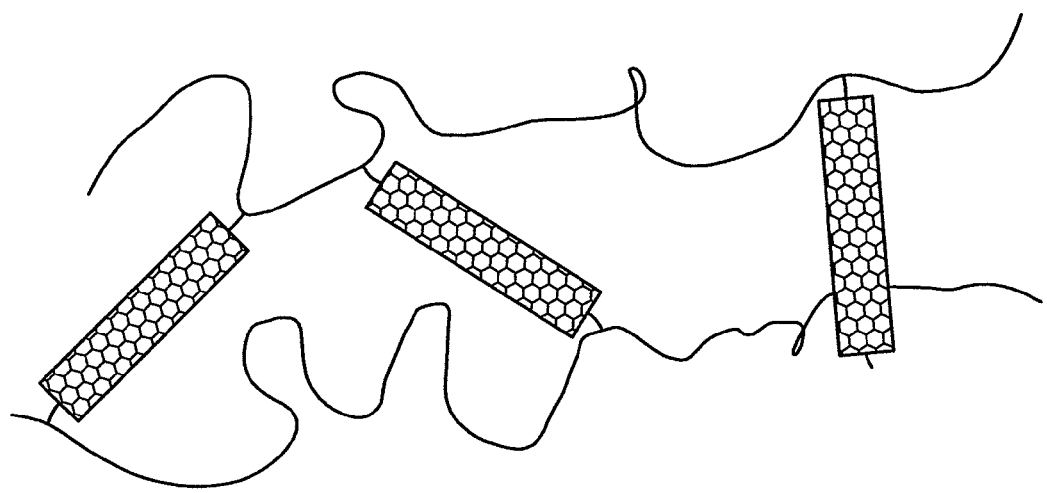
FIG. 40 shows functionalized SWNTs in graft copolymerization.
Figure 41:
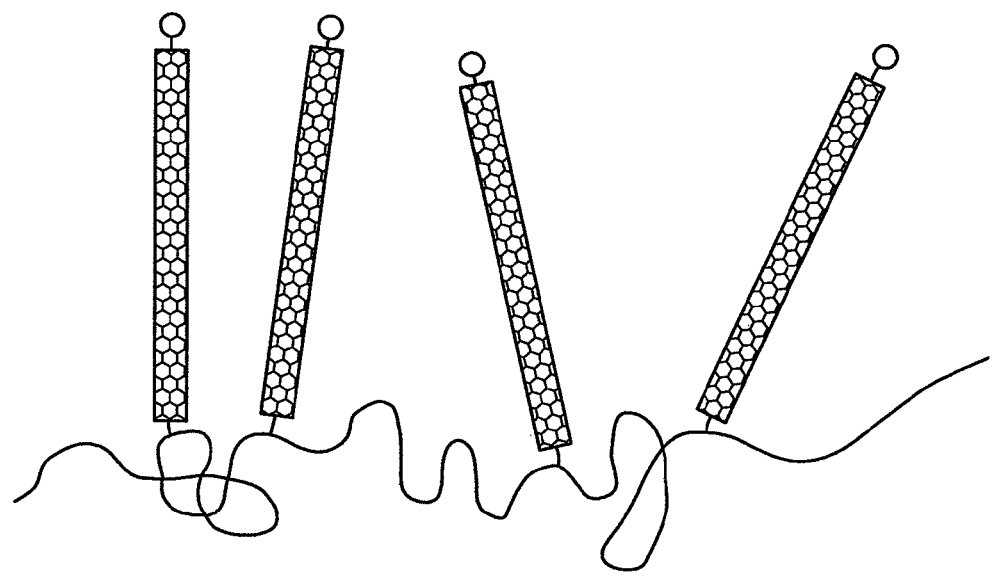
FIG. 41 shows graft copolymerization on only one side.

Crosslinking can also occur in these cases, and the amount of crosslinking can be controlled by limiting the amount of reagent that will create the functional group x on the open nanotube tips. In this way the average amount of "activated" sites is controlled. Closed SWNT tips can also be modified by applying the knowledge of fullerene chemistry which would allow more options for the attachment of functional groups that will link the polymer to the nanotube. Another possibility is to use functionalized SWNTs in a graft copolymerization as shown in FIG. 40, nanotube graft copolymer with the nanotubes acting as crosslinking agents. The polymer with a chain containing reactive groups (the amount of which can be controlled) can be mixed with "activated" nanotubes, which can be made to bond to the sides of the chain. This approach can also result in crosslinks, with the nanotubes bridging between polymer chains. It is also possible to create polymer chains with nanotubes only on the sides, by controlling the reaction, or the reactive groups in the nanotube tips. For example, the tips can be attached to a solid support, the exposed tip "deactivated" and the other tip derivatized to react with the polymer chain as shown in FIG. 41, nanotube graft copolymer where only one side of the nanotube can attach to the polymer chain.

A second approach is to use sidewall derivatization of single-walled nanotubes. The sidewalls of the nanotubes can be fluorinated, and control of the amount of fluorination is possible (up to a stoichiometry of C2F). The fluorine groups can be substituted by organic groups, as previously shown for alkyl chains. Several different terminal organic groups could be attached to the sidewall, and further modified by organic chemistry techniques. In the simplest approach, modification of the sidewall can be used to control the interactions of the polymers and the nanotubes, making the SWNTs compatible with several polymer matrices with or without polar groups. The fluorinated and alkylated SWNTs would also be dispersed as individual tubes to form stable suspensions in polar solvents (e.g. alcohols), allowing for easier manipulation, dispersability, as well as doing chemistry on the sidewalls.

Figure 42:
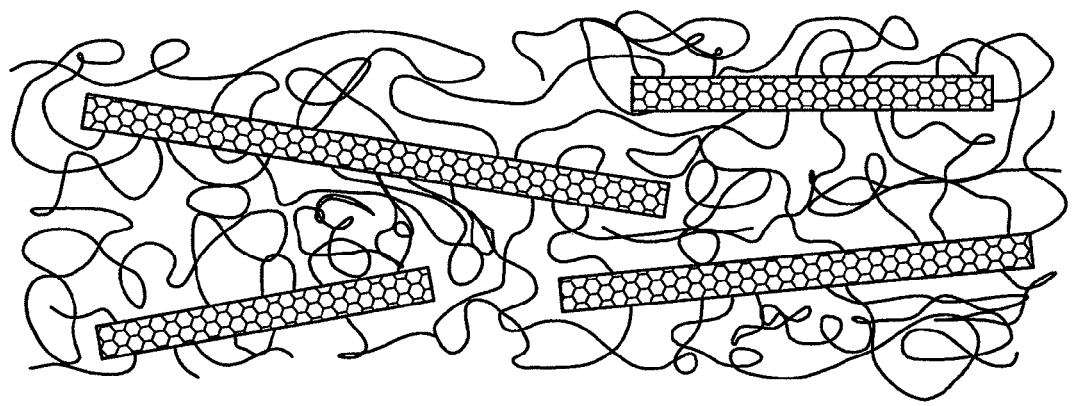
FIG. 42 shows a randomly crosslinked chain.
Figure 43:
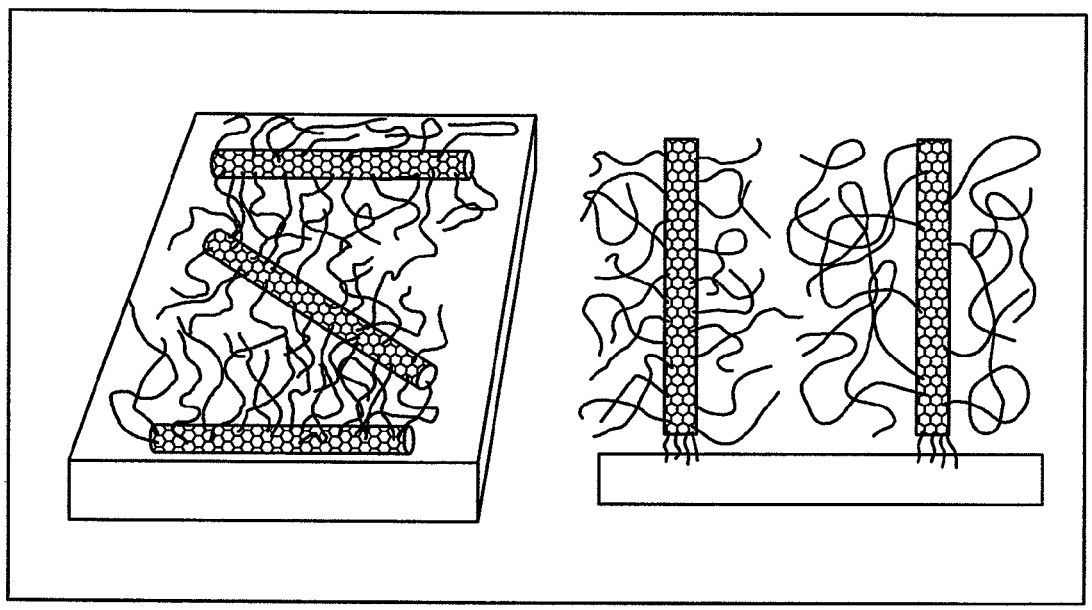
FIG. 43 shows substrate attached nanotubes.
Figure 44:
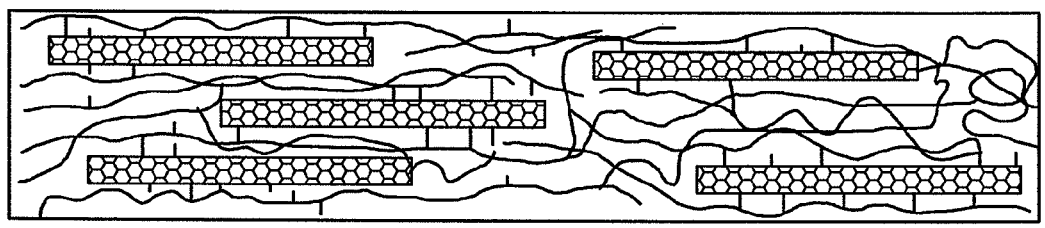
FIG. 44 shows nanotubes shear oriented and chemically bonded to the polymer matrix.

Having reactive groups on the walls allows for polymerization to start from the nanotubes, in a way similar to the one sketched in the right side of FIG. 35. In the case of sidewall derivatization, however, the nanotube acts as a multifunctional starter for polymerization, and the resulting polymer nanotube composite will most likely be heavily crosslinked, possibly resulting in a thermoset nature of the final product. The expected structure is sketched in FIG. 42, side-wall attached polymer-nanotube composite, with random polymerization creating crosslinking. One of the proposed ways to minimize or control this random crosslinking could be to deposit (and attach) the nanotubes on a substrate, such that part of the nanotube wall will not be covered with polymer chains, as shown in the left panel of FIG. 43. FIG. 43 illustrates "Hairy-tube composites". Left side: SWNTs over a substrate, only the exposed surface is covered with polymer. Right side: Tips of SWNTs attached to a solid support, with the possibility of controlling the length and crosslinking of the polymer chains. Another possibility is to use the chemistry of the tips to attach the nanotubes to solid supports, creating "hairy-tube composites". The amounts of polymerization initiation groups in the tube walls can be varied, the probability of crosslinking can be controlled by spacing the attachment points of the nanotubes, and by controlling the degree of polymerization. A concept sketch of this approach is shown in the right panel of FIG. 43. Control of the length of polymer chains attached to the nanotubes allows control over the properties of the final composite. Several different polymer chains can be attached this way, without concern over the adequacy of the solvent for suspending or dissolving the nanotubes.

The attachment of the SWNT tips to a solid support can also be an approach to create nanotube block co-polymers, like those shown in FIGS. 39 and 40. Polymerization can be started from the exposed tip, or a polymer block can be attached to it. This approach can also be used to polymerize alternating monomers, in a way analogous to the Merrifield solid phase syntheses of peptides in biochemistry. After detaching the nanotube from the solid support it is possible to attach another polymer to the unreacted tip, or to use it to graft the nanotube-block copolymer to side groups in a different polymer.

Figure 45:
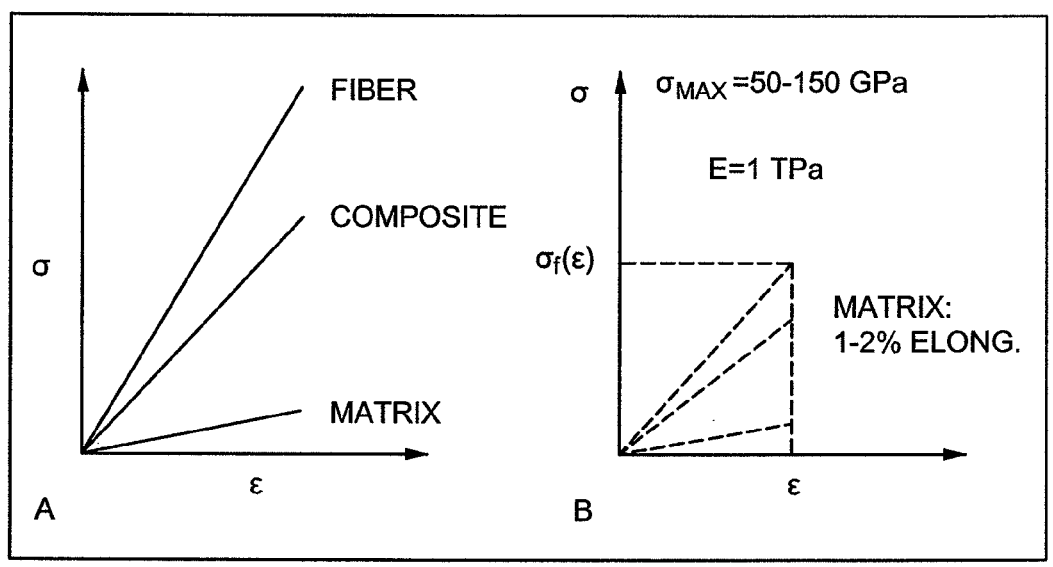
FIG. 45 shows a typical composite design system.

The aligned SWNTs advanced polymers that can be made in this way are shown in one example in FIG. 45, nanotubes shear oriented and then chemically bonded to the polymer matrix. Combining polymerization with high shear alignment methods we can produce a system analogous to Kevlar or ultra high density polyethylene where the nanoscale features are highly aligned and therefore lead to enhanced properties. At this point the idea of mimicking SWNTs starts to take over. Providing bonding to continue the enhancements that can be achieved by the nanotubes is the important selection point for this research.

It is important to note that sidewall derivatization of the nanotubes will disrupt the continuity of the graphene sheet, which will have an effect on the electrical, thermal and mechanical properties of the SWNTs. Using the tips as anchor points may be a better choice in several cases. Another important point will be the feasibility of sorting tubes by length, diameter of type, to ensure that the tubes used will be of those for promoting electrical conduction. Mimicking of the nanotubes on larger scales means designing the chemical attachment to provide for good stability of properties of the nanotubes. Integration means reducing the possibility of free matrix (material without integrated SWNTs). Continuation of this concept leads to the use of gas permeable plastics. Since the conducting polymers will have a significant conducting range as to how they are processed, coupling to gas permeable plastics so that gas detection can occur is possible. Interactions with gases will alter the conduction providing a sensing capability to the wire of sheet configurations. Through SWNT purification, separation, functionalization, and combining SWNTs with gas permeable polymers, and tailoring conduction and percolation, these systems may well be used to alter electrical conduction of the conducting polymers when in contact with various gases.

Example

Shielding for Micrometeoroid Protection Developed from Toughened Fully Integrated Nanotube Composites Fully integrated nanotube composites are described above to mimic on a larger scale the properties of nanotubes so that their properties can be used more aggressively on micro and macro scales. The general discussion of the previous section on nanotube tip attachment, crosslinking, block co-polymers, graft copolymers, side wall attachment, and substrates is equally applicable here, and is incorporated by reference. An example application is shielding for space applications where extremes of lightweight and strength and toughness are desired.

Although composite materials are seen as a methodology for producing advanced materials with nanotubes, conventional composite processing may not be the way to go when it comes to ultra high strength systems. If one considers that epoxies are the matrix of choice for many composite applications since higher strength features are usually realized, one must also acknowledge that the elongation features of the epoxies are significantly lower than those expected for SWNTs. FIG. 46 shows how one would typically design a composite system compared to that expected for SWNTs in an epoxy matrix. Note that for the nanocomposite, it is not the ultimate strength of the nanotube but $\sigma_f(\varepsilon)$ since the matrix fails at a much lower strain than the reinforcement. Where typical reinforcements see similar elongation capability between the matrix and the fibers, the SWNT system is unusual because SWNTs are expected to have elongations up to 5 percent. At the onset, a significant portion of the strength capability of nanotubes appears to be discarded when coupled with typical epoxy resins. Even so, strength enhancements when using this approach are projected to be three orders of magnitude greater than the unfilled polymer when considering rule of mixtures calculations which are only used here to serve as order of magnitude, "back of the envelope" calculations. Table 1 shows the parameters for the nanotubes and matrices used in the various calculations of mechanical strength. Although the resulting property enhancements seem high, one should acknowledge that high strength epoxies that provide ample strength enhancements over the unfilled epoxy do already exist. Therefore, conventional composites development are not the way to go since so much of the potential of the nanotubes is discarded.

Calculations indicate that the critical length of a nanotube to get full use for strengthening (based on $\sigma_f(\varepsilon)$) should be about six microns, assuming a fully aligned discontinuous system occurs. Current understanding of the length of SWNTs is that they are 0.3-0.6 microns in length and far less than that needed for preferred strength enhancements. Note however that short fibers do lead to toughness enhancements. Note also that these calculations assume complete bonding between the nanotubes and the matrix even though this may not be the case. Bonding through functionalization is likely to be intermittent along the nanotube and for unfunctionalized SWNTs is expected to be solely by van der Waals forces which only becomes significant for longer nanotubes. One additional consideration to make includes exploring the fact that a majority of the SWNT composites processed to date are not aligned systems. FIG. 47 shows by means of the Kelly-Tyson equation the expected composite strength of a SWNT composite with off axis alignment. Note the further reduction in composite strength due to low shear strength and normal stresses. For these various reasons, extensions in processing with SWNTs to produce advanced materials must be accomplished by looking beyond what has been the typical approach of the past. Although the use of rule of mixture calculations and the Kelly-Tyson equations may not be ideal or used appropriately for nanotube composites, one gains a sense that there are significant shortcomings by more conventional composite manufacturing approaches. Note that initially when all fibers are aligned with the applied load the strength of the composite is rather high. As the fibers become misoriented with the load (as in the case of an isotropic composite where SWNTs are randomly dispersed), the composite strength goes way down due to low shear and normal strength contributions. On one hand you might use conventional processing to improve the shear and normal stresses where as the approach of the current invention is to fully integrate and therefore remove defects that might also result in the matrix. As to the manner of operation and use of the present invention, the same is made apparent from the foregoing discussion. With respect to the above description, it is to be realized that although an enabling embodiment is disclosed, the enabling embodiment is illustrative, and the optimum relationships for the steps of the invention and calculations are to include variations in size, material, shape, form, function and manner of operation, assembly and use, which are deemed readily apparent to one skilled in the art in view of this disclosure, and all equivalent relationships to those illustrated in the drawings and encompassed in the specifications are intended to be encompassed by the present invention.

Therefore, the foregoing is considered as illustrative of the principles of the invention and since numerous modifications will readily occur to those skilled in the art, it is not desired to limit the invention to the exact construction and operation shown or described, and all suitable modifications and equivalents may be resorted to, falling within the scope of the invention.

What is claimed is:

1. A composite comprising:
   a polymer matrix reinforced with carbon nanotubes,
      wherein the carbon nanotubes are dispersed in the polymer matrix; and
      wherein the carbon nanotubes are integrated into the polymer matrix;
         wherein the integration comprises alignment of the carbon nanotubes and formation of at least one type of linkage to at least a sidewall of the carbon nanotubes;
            wherein the at least one type of linkage is selected from the group consisting of between the carbon nanotubes and the polymer matrix, between the carbon nanotubes, and combinations thereof.

2. The composite of claim 1, wherein the carbon nanotubes are derivatized with functional groups on at least the sidewall of the carbon nanotubes; and
   wherein the functional groups link the polymer matrix to the carbon nanotubes.

3. The composite of claim 1, wherein the carbon nanotube are derivatized on at least the sidewall of the carbon nanotubes.

4. The composite of claim 1, wherein the composite has a carbon nanotube concentration of up to 60% by weight.

5. The composite of claim 1, wherein the polymer matrix is selected from the group consisting of Acetal, PP, ABS, ASA, PE, PEEK, PET, nylon and UHMW PE.

6. The composite of claim 1, wherein the carbon nanotubes comprise SWNTs, and the composite comprises up to about 10 percent by weight of SWNTs.

7. A product comprising the composite of claim 1, wherein the composite is processed into a product selected from the group consisting of micron size fibers, tapes, and films.

8. The product of claim 7, wherein the product is further processed into a form selected from the group consisting of weaves, mats, plies, bundles, threads, yarns and filament wound tubing and vessels.

9. The product of claim 7, wherein the product comprises a delivery system for aligning the carbon nanotubes into another composite form.

10. The composite of claim 7, wherein the product is further processed with other polymer systems.

11. The product of claim 10, wherein the other polymer systems comprise a thermoset.

12. The product of claim 10, wherein the product is disposed within the other polymer systems in a manner selected from the group consisting of oriented, non-oriented and combinations thereof.

13. The product of claim 10, wherein the carbon nanotubes are disposed within the product in a manner selected from the group consisting of aligned, non-aligned and combinations thereof.

14. A sensor product the composite of claim 7, wherein the polymer matrix is gas permeable.

15. A shielding material for hypervelocity impact applications comprising the composite of claim 1.

16. An ESD material comprising the composite of claim 1.

17. An electronically conductive wire comprising the composite of claim 7.

18. An electrical interconnect comprising the composite of claim 7.

19. FDM components formed from the composite of claim 7.

* * * * *